US012171011B2

(12) United States Patent
Lee et al.

(10) Patent No.: US 12,171,011 B2
(45) Date of Patent: Dec. 17, 2024

(54) RECONFIGURATION OF SIDELINK CONFIGURATION AND SIDELINK RESOURCE ALLOCATION

(71) Applicant: LG ELECTRONICS INC., Seoul (KR)

(72) Inventors: Youngdae Lee, Seoul (KR); Giwon Park, Seoul (KR); Jongyoul Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 348 days.

(21) Appl. No.: 17/753,983

(22) PCT Filed: Sep. 29, 2020

(86) PCT No.: PCT/KR2020/013300
§ 371 (c)(1),
(2) Date: Mar. 21, 2022

(87) PCT Pub. No.: WO2021/066500
PCT Pub. Date: Apr. 8, 2021

(65) Prior Publication Data

US 2023/0319852 A1 Oct. 5, 2023

Related U.S. Application Data

(60) Provisional application No. 62/910,413, filed on Oct. 3, 2019.

(51) Int. Cl.
*H04W 72/30* (2023.01)
*H04W 76/23* (2018.01)
*H04W 76/27* (2018.01)

(52) U.S. Cl.
CPC .......... *H04W 72/30* (2023.01); *H04W 76/23* (2018.02); *H04W 76/27* (2018.02)

(58) Field of Classification Search
CPC ..... H04W 72/30; H04W 76/23; H04W 76/27; H04W 72/23; H04W 76/14; H04W 76/19;
(Continued)

(56) References Cited

U.S. PATENT DOCUMENTS

2018/0115930 A1 4/2018 Belleschi et al.
2018/0160418 A1 6/2018 Luo et al.
(Continued)

FOREIGN PATENT DOCUMENTS

EP 3833129 A1 * 6/2021 ............ H04W 72/04
EP 4037406 A1 * 8/2022 ............ H04W 72/10
WO 2017-213687 12/2017

OTHER PUBLICATIONS (KR 20210039456 A) issued to Hongjia et al. >>> Resource Configuration Method of Sidelink Information, Communication Device and Network Device (see title) (Year: 2021).*
(Continued)

*Primary Examiner* — Meless N Zewdu
(74) *Attorney, Agent, or Firm* — LEE, HONG, DEGERMAN, KANG & WAIMEY

(57) ABSTRACT

A method and apparatus for reconfiguration of sidelink configuration and sidelink resource allocation in a wireless communication system is provided. Upon leaving a connected state and entering a new state, while in the new state, a first wireless device configured to operate in a wireless communication system keeps performing sidelink transmission to a second wireless device based on a first sidelink configuration received via dedicated signaling, receives, from a network via broadcast signaling, a second sidelink configuration, and performs the sidelink transmission to the second wireless device based on the second sidelink configuration.

15 Claims, 16 Drawing Sheets

(58) Field of Classification Search

CPC ..... H04W 92/18; H04W 72/25; H04W 72/40; H04W 72/231; H04W 72/232; H04W 72/20; H04W 72/121; H04W 72/1263; H04W 72/1268; H04W 72/1273; H04W 28/0875; H04W 52/383; H04W 36/08; H04W 4/40; H04W 56/00; H04W 72/04; H04W 72/12; H04W 76/04; H04W 76/18; H04W 88/04; H04W 76/11; H04W 76/10; H04W 8/18; H04W 48/00; H04W 24/02; H04W 88/00; H04W 88/02; H04W 88/08; H04W 88/10; H04W 88/18; H04W 88/005; H04W 48/16; H04W 48/18; H04W 48/20; H04W 60/00; H04W 60/005; H04W 60/04; H04W 28/00; H04W 28/02; H04W 28/12; H04W 80/00; H04W 16/00; H04W 16/02; H04W 16/04; H04W 16/10; H04W 16/12; H04W 16/14; H04W 76/00; H04W 76/15; H04W 76/16; H04W 12/0017; H04W 12/0013; H04W 74/002; H04W 74/006; H04W 8/20; H04W 8/08; H04B 7/06954; G06F 2209/5016; G06F 2209/5015; H04L 29/0619; H04L 29/06197; H04L 29/06319; H04L 29/06326; H04L 61/2564; H04L 61/3085; H04L 61/309; H04L 65/1003; H04L 65/1006; H04L 12/5692; H04L 12/5691

See application file for complete search history.

(56) References Cited

U.S. PATENT DOCUMENTS

| | | | | |
|---|---|---|---|---|
| 2019/0045576 | A1 | 2/2019 | Jung et al. | |
| 2019/0166533 | A1 | 5/2019 | Li et al. | |
| 2019/0254105 | A1* | 8/2019 | Kim et al. ............ | H04W 76/27 |
| 2020/0029384 | A1* | 1/2020 | Hong et al. ........... | H04W 76/19 |
| 2020/0045674 | A1* | 2/2020 | Tseng et al. .......... | H04W 76/19 |
| 2021/0168767 | A1* | 6/2021 | Zhao ..................... | H04W 72/02 |

OTHER PUBLICATIONS

Zhang et al. (CN 105898894 A) >>> RRC State of Control Method and Device (see title) (Year: 2016).*

Jun et al. (BR 112020026611 A2) >>> Communication Method, Appliance and Storage Media (see title) (Year: 2021).*

Jianhua et al. (EP 3624486 B1) >>> Resource Configuration Method, Terminal Device and Network Device ( see title) (Year: 2021).*

Lin et al. (KR 20220045213 A) >>> Method And Device For Transmitting Sidelink System Information (see title) (Year: 2022).*

PCT International Application No. PCT/KR2020/013300, International Search Report dated Dec. 30, 2020, 2 pages.

3rd Generation Partnership Project, "Technical Specification Group Radio Access Network; Evolved Universal Terrestrial Radio Access (E-UTRA); Radio Resource Control (RRC); Protocol specification (Release 15)," Section 6.10.2 of 3GPP TS 36.331 V15.6.0, Jun. 2019, 960 pages.

* cited by examiner

RECONFIGURATION OF SIDELINK CONFIGURATION AND SIDELINK RESOURCE ALLOCATION

CROSS-REFERENCE TO RELATED APPLICATIONS

This application is the National Stage filing under 35 U.S.C. 371 of International Application No. PCT/KR2020/013300, filed on Sep. 29, 2020, which claims the benefit of U.S. Provisional Application No. 62/910,413, filed on Oct. 3, 2019, the contents of which are all hereby incorporated by reference herein in their entireties.

TECHNICAL FIELD

The present disclosure relates to reconfiguration of sidelink configuration and sidelink resource allocation.

BACKGROUND

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Work has started in international telecommunication union (ITU) and 3GPP to develop requirements and specifications for new radio (NR) systems. 3GPP has to identify and develop the technology components needed for successfully standardizing the new RAT timely satisfying both the urgent market needs, and the more long-term requirements set forth by the ITU radio communication sector (ITU-R) international mobile telecommunications (IMT)-2020 process. Further, the NR should be able to use any spectrum band ranging at least up to 100 GHz that may be made available for wireless communications even in a more distant future.

The NR targets a single technical framework addressing all usage scenarios, requirements and deployment scenarios including enhanced mobile broadband (eMBB), massive machine-type-communications (mMTC), ultra-reliable and low latency communications (URLLC), etc. The NR shall be inherently forward compatible.

Vehicle-to-everything (V2X) communication is the passing of information from a vehicle to any entity that may affect the vehicle, and vice versa. It is a vehicular communication system that incorporates other more specific types of communication as vehicle-to-infrastructure (V2I), vehicle-to-network (V2N), vehicle-to-vehicle (V2V), vehicle-to-pedestrian (V2P), vehicle-to-device (V2D) and vehicle-to-grid (V2G).

SUMMARY

An aspect of the present disclosure is to provide a method and apparatus for reconfiguring sidelink configuration and sidelink resource allocation in state transition.

An aspect of the present disclosure is to provide a method and apparatus for applying a dedicated sidelink configuration even after leaving a connected state.

In an aspect, a method performed by a first wireless device configured to operate in a wireless communication system is provided. The method includes, upon leaving a connected state and entering a new state, while in the new state: i) keeping performing sidelink transmission to a second wireless device based on a first sidelink configuration received via dedicated signaling, ii) receiving, from a network via broadcast signaling, a second sidelink configuration, and iii) performing the sidelink transmission to the second wireless device based on the second sidelink configuration.

In another aspect, an apparatus for implementing the above method is provided.

The present disclosure can have various advantageous effects.

For example, a UE can properly reconfigure sidelink transmission and reception, in particular when the UE leaves a certain state and/or a certain area and/or when the UE detects a certain problem.

For example, the system can reconfigure sidelink transmission and reception for a UE in state transition.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

DETAILED DESCRIPTION

Figure 1:
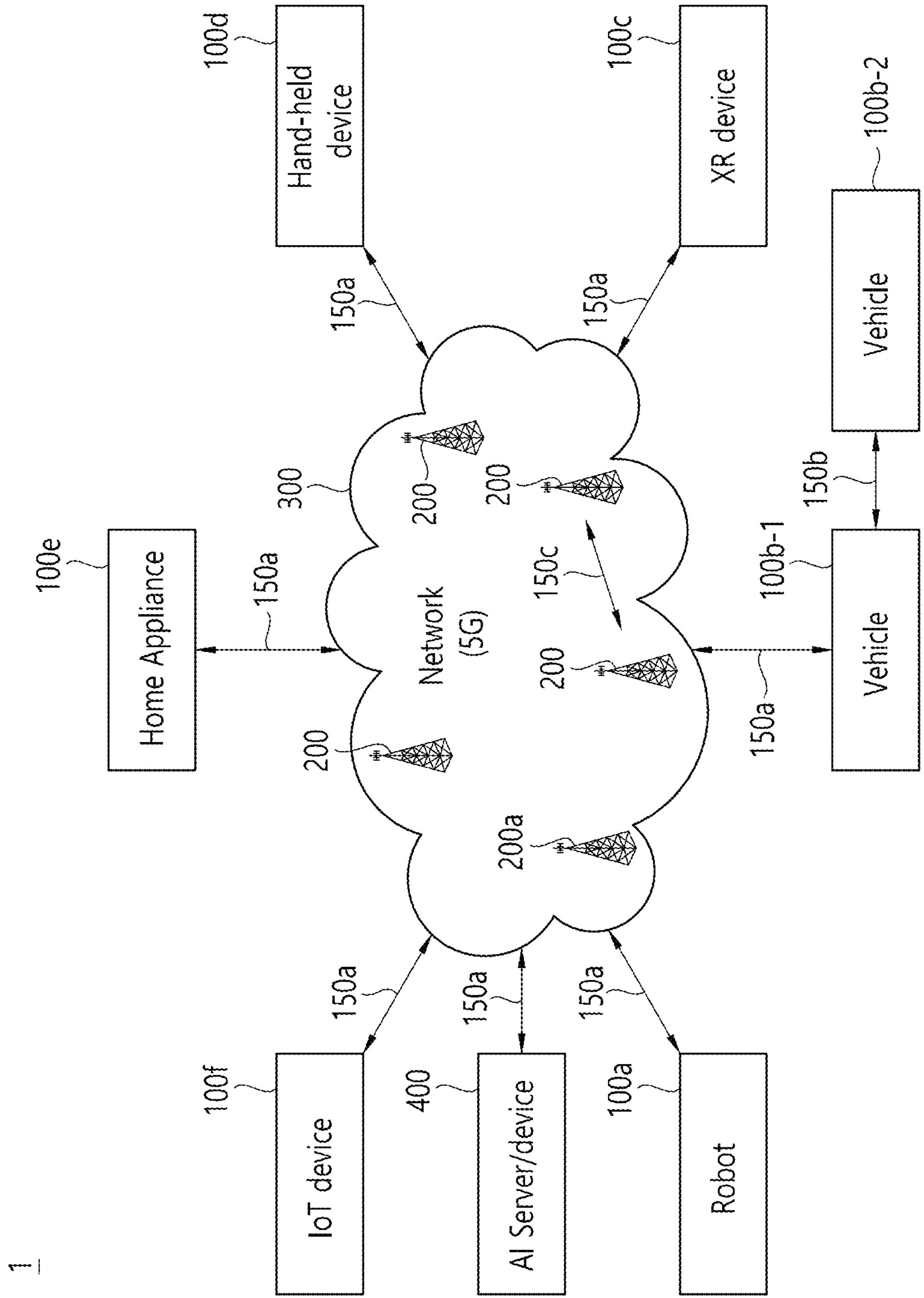
FIG. 1 shows an example of a communication system to which implementations of the present disclosure is applied.

The following techniques, apparatuses, and systems may be applied to a variety of wireless multiple access systems. Examples of the multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multicarrier frequency division multiple access (MC-FDMA) system. CDMA may be embodied through radio technology such as universal terrestrial radio access (UTRA) or CDMA2000. TDMA may be embodied through radio technology such as global system for mobile communications (GSM), general packet radio service (GPRS), or enhanced data rates for GSM evolution (EDGE). OFDMA may be embodied through radio technology such as institute of electrical and electronics engineers (IEEE) 802.11 (Wi-Fi), IEEE 802.16 (WiMAX), IEEE 802.20, or evolved UTRA (E-UTRA). UTRA is a part of a universal mobile telecommunications system (UMTS). 3rd generation partnership project (3GPP) long term evolution (LTE) is a part of evolved UMTS (E-UMTS) using E-UTRA. 3GPP LTE employs OFDMA in DL and SC-FDMA in UL. LTE-advanced (LTE-A) is an evolved version of 3GPP LTE.

For convenience of description, implementations of the present disclosure are mainly described in regards to a 3GPP based wireless communication system. However, the technical features of the present disclosure are not limited thereto. For example, although the following detailed description is given based on a mobile communication system corresponding to a 3GPP based wireless communication system, aspects of the present disclosure that are not limited to 3GPP based wireless communication system are applicable to other mobile communication systems.

For terms and technologies which are not specifically described among the terms of and technologies employed in the present disclosure, the wireless communication standard documents published before the present disclosure may be referenced.

In the present disclosure, "A or B" may mean "only A", "only B", or "both A and B". In other words, "A or B" in the present disclosure may be interpreted as "A and/or B". For example, "A, B or C" in the present disclosure may mean "only A", "only B", "only C", or "any combination of A, B and C".

In the present disclosure, slash (/) or comma (,) may mean "and/or". For example, "A/B" may mean "A and/or B". Accordingly, "A/B" may mean "only A", "only B", or "both A and B". For example, "A, B, C" may mean "A, B or C".

In the present disclosure, "at least one of A and B" may mean "only A", "only B" or "both A and B". In addition, the expression "at least one of A or B" or "at least one of A and/or B" in the present disclosure may be interpreted as same as "at least one of A and B".

In addition, in the present disclosure, "at least one of A, B and C" may mean "only A", "only B", "only C", or "any combination of A, B and C". In addition, "at least one of A, B or C" or "at least one of A, B and/or C" may mean "at least one of A, B and C".

Also, parentheses used in the present disclosure may mean "for example". In detail, when it is shown as "control information (PDCCH)", "PDCCH" may be proposed as an example of "control information". In other words, "control information" in the present disclosure is not limited to "PDCCH", and "PDDCH" may be proposed as an example of "control information". In addition, even when shown as "control information (i.e., PDCCH)", "PDCCH" may be proposed as an example of "control information".

Technical features that are separately described in one drawing in the present disclosure may be implemented separately or simultaneously.

Although not limited thereto, various descriptions, functions, procedures, suggestions, methods and/or operational flowcharts of the present disclosure disclosed herein can be applied to various fields requiring wireless communication and/or connection (e.g., 5G) between devices.

Hereinafter, the present disclosure will be described in more detail with reference to drawings. The same reference numerals in the following drawings and/or descriptions may refer to the same and/or corresponding hardware blocks, software blocks, and/or functional blocks unless otherwise indicated.

FIG. 1 shows an example of a communication system to which implementations of the present disclosure is applied.

The 5G usage scenarios shown in FIG. 1 are only exemplary, and the technical features of the present disclosure can be applied to other 5G usage scenarios which are not shown in FIG. 1.

Three main requirement categories for 5G include (1) a category of enhanced mobile broadband (eMBB), (2) a category of massive machine type communication (mMTC), and (3) a category of ultra-reliable and low latency communications (URLLC).

Partial use cases may require a plurality of categories for optimization and other use cases may focus only upon one key performance indicator (KPI). 5G supports such various use cases using a flexible and reliable method.

eMBB far surpasses basic mobile Internet access and covers abundant bidirectional work and media and entertainment applications in cloud and augmented reality. Data is one of 5G core motive forces and, in a 5G era, a dedicated voice service may not be provided for the first time. In 5G, it is expected that voice will be simply processed as an application program using data connection provided by a communication system. Main causes for increased traffic volume are due to an increase in the size of content and an increase in the number of applications requiring high data transmission rate. A streaming service (of audio and video), conversational video, and mobile Internet access will be more widely used as more devices are connected to the Internet. These many application programs require connectivity of an always turned-on state in order to push real-time information and alarm for users. Cloud storage and applications are rapidly increasing in a mobile communication platform and may be applied to both work and entertainment. The cloud storage is a special use case which accelerates growth of uplink data transmission rate. 5G is also used for remote work of cloud. When a tactile interface is used, 5G demands much lower end-to-end latency to maintain user good experience. Entertainment, for example, cloud gaming and video streaming, is another core element which increases demand for mobile broadband capability. Entertainment is essential for a smartphone and a tablet in any place including high mobility environments such as a train, a vehicle, and an airplane. Other use cases are augmented reality for entertainment and information search. In this case, the augmented reality requires very low latency and instantaneous data volume.

In addition, one of the most expected 5G use cases relates a function capable of smoothly connecting embedded sensors in all fields, i.e., mMTC. It is expected that the number of potential Internet-of-things (IoT) devices will reach 204 hundred million up to the year of 2020. An industrial IoT is one of categories of performing a main role enabling a smart city, asset tracking, smart utility, agriculture, and security infrastructure through 5G.

URLLC includes a new service that will change industry through remote control of main infrastructure and an ultra-reliable/available low-latency link such as a self-driving vehicle. A level of reliability and latency is essential to control a smart grid, automatize industry, achieve robotics, and control and adjust a drone.

5G is a means of providing streaming evaluated as a few hundred megabits per second to gigabits per second and may complement fiber-to-the-home (FTTH) and cable-based broadband (or DOCSIS). Such fast speed is needed to deliver TV in resolution of 4K or more (6K, 8K, and more), as well as virtual reality and augmented reality. Virtual reality (VR) and augmented reality (AR) applications include almost immersive sports games. A specific application program may require a special network configuration. For example, for VR games, gaming companies need to incorporate a core server into an edge network server of a network operator in order to minimize latency.

Automotive is expected to be a new important motivated force in 5G together with many use cases for mobile communication for vehicles. For example, entertainment for passengers requires high simultaneous capacity and mobile broadband with high mobility. This is because future users continue to expect connection of high quality regardless of their locations and speeds. Another use case of an automotive field is an AR dashboard. The AR dashboard causes a driver to identify an object in the dark in addition to an object seen from a front window and displays a distance from the object and a movement of the object by overlapping information talking to the driver. In the future, a wireless module enables communication between vehicles, information exchange between a vehicle and supporting infrastructure, and information exchange between a vehicle and other connected devices (e.g., devices accompanied by a pedestrian). A safety system guides alternative courses of a behavior so that a driver may drive more safely drive, thereby lowering the danger of an accident. The next stage will be a remotely controlled or self-driven vehicle. This requires very high reliability and very fast communication between different self-driven vehicles and between a vehicle and infrastructure. In the future, a self-driven vehicle will perform all driving activities and a driver will focus only upon abnormal traffic that the vehicle cannot identify. Technical requirements of a self-driven vehicle demand ultra-low latency and ultra-high reliability so that traffic safety is increased to a level that cannot be achieved by human being.

A smart city and a smart home/building mentioned as a smart society will be embedded in a high-density wireless sensor network. A distributed network of an intelligent sensor will identify conditions for costs and energy-efficient maintenance of a city or a home. Similar configurations may be performed for respective households. All of temperature sensors, window and heating controllers, burglar alarms, and home appliances are wirelessly connected. Many of these sensors are typically low in data transmission rate, power, and cost. However, real-time HD video may be demanded by a specific type of device to perform monitoring.

Consumption and distribution of energy including heat or gas is distributed at a higher level so that automated control of the distribution sensor network is demanded. The smart grid collects information and connects the sensors to each other using digital information and communication technology so as to act according to the collected information. Since this information may include behaviors of a supply company and a consumer, the smart grid may improve distribution of fuels such as electricity by a method having efficiency, reliability, economic feasibility, production sustainability, and automation. The smart grid may also be regarded as another sensor network having low latency.

Mission critical application (e.g., e-health) is one of 5G use scenarios. A health part contains many application programs capable of enjoying benefit of mobile communication. A communication system may support remote treatment that provides clinical treatment in a faraway place. Remote treatment may aid in reducing a barrier against distance and improve access to medical services that cannot be continuously available in a faraway rural area. Remote treatment is also used to perform important treatment and save lives in an emergency situation. The wireless sensor network based on mobile communication may provide remote monitoring and sensors for parameters such as heart rate and blood pressure.

Wireless and mobile communication gradually becomes important in the field of an industrial application. Wiring is high in installation and maintenance cost. Therefore, a possibility of replacing a cable with reconstructible wireless links is an attractive opportunity in many industrial fields. However, in order to achieve this replacement, it is necessary for wireless connection to be established with latency, reliability, and capacity similar to those of the cable and management of wireless connection needs to be simplified. Low latency and a very low error probability are new requirements when connection to 5G is needed.

Logistics and freight tracking are important use cases for mobile communication that enables inventory and package tracking anywhere using a location-based information system. The use cases of logistics and freight typically demand low data rate but require location information with a wide range and reliability.

Referring to FIG. 1, the communication system 1 includes wireless devices 100*a* to 100*f*, base stations (BSs) 200, and a network 300. Although FIG. 1 illustrates a 5G network as an example of the network of the communication system 1, the implementations of the present disclosure are not limited to the 5G system, and can be applied to the future communication system beyond the 5G system.

The BSs 200 and the network 300 may be implemented as wireless devices and a specific wireless device may operate as a BS/network node with respect to other wireless devices.

The wireless devices 100*a* to 100*f* represent devices performing communication using radio access technology (RAT) (e.g., 5G new RAT (NR)) or LTE) and may be referred to as communication/radio/5G devices. The wireless devices 100*a* to 100*f* may include, without being limited to, a robot 100*a*, vehicles 100*b*-1 and 100*b*-2, an extended reality (XR) device 100*c*, a hand-held device 100*d*, a home appliance 100*e*, an IoT device 100*f*, and an artificial intelligence (AI) device/server 400. For example, the vehicles may include a vehicle having a wireless communication function, an autonomous driving vehicle, and a vehicle capable of performing communication between vehicles.

The vehicles may include an unmanned aerial vehicle (UAV) (e.g., a drone). The XR device may include an AR/VR/Mixed Reality (MR) device and may be implemented in the form of a head-mounted device (HMD), a head-up display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter.

In the present disclosure, the wireless devices 100*a* to 100*f* may be called user equipments (UEs). A UE may include, for example, a cellular phone, a smartphone, a laptop computer, a digital broadcast terminal, a personal digital assistant (PDA), a portable multimedia player (PMP), a navigation system, a slate personal computer (PC), a tablet PC, an ultrabook, a vehicle, a vehicle having an autonomous traveling function, a connected car, an UAV, an AI module, a robot, an AR device, a VR device, an MR device, a hologram device, a public safety device, an MTC device, an IoT device, a medical device, a FinTech device (or a financial device), a security device, a weather/environment device, a device related to a 5G service, or a device related to a fourth industrial revolution field.

The UAV may be, for example, an aircraft aviated by a wireless control signal without a human being onboard.

The VR device may include, for example, a device for implementing an object or a background of the virtual world. The AR device may include, for example, a device implemented by connecting an object or a background of the virtual world to an object or a background of the real world. The MR device may include, for example, a device implemented by merging an object or a background of the virtual world into an object or a background of the real world. The hologram device may include, for example, a device for implementing a stereoscopic image of 360 degrees by recording and reproducing stereoscopic information, using an interference phenomenon of light generated when two laser lights called holography meet.

The public safety device may include, for example, an image relay device or an image device that is wearable on the body of a user.

The MTC device and the IoT device may be, for example, devices that do not require direct human intervention or manipulation. For example, the MTC device and the IoT device may include smartmeters, vending machines, thermometers, smartbulbs, door locks, or various sensors.

Here, the radio communication technologies implemented in the wireless devices in the present disclosure may include narrowband internet-of-things (NB-IoT) technology for low-power communication as well as LTE, NR and 6G. For example, NB-IoT technology may be an example of low power wide area network (LPWAN) technology, may be implemented in specifications such as LTE Cat NB1 and/or LTE Cat NB2, and may not be limited to the above-mentioned names. Additionally and/or alternatively, the radio communication technologies implemented in the wireless devices in the present disclosure may communicate based on LTE-M technology. For example, LTE-M technology may be an example of LPWAN technology and be called by various names such as enhanced machine type communication (eMTC). For example, LTE-M technology may be implemented in at least one of the various specifications, such as 1) LTE Cat 0, 2) LTE Cat M1, 3) LTE Cat M2, 4) LTE non-bandwidth limited (non-BL), 5) LTE-MTC, 6) LTE Machine Type Communication, and/or 7) LTE M, and may not be limited to the above-mentioned names. Additionally and/or alternatively, the radio communication technologies implemented in the wireless devices in the present disclosure may include at least one of ZigBee, Bluetooth, and/or LPWAN which take into account low-power communication, and may not be limited to the above-mentioned names. For example, ZigBee technology may generate personal area networks (PANs) associated with small/low-power digital communication based on various specifications such as IEEE 802.15.4 and may be called various names.

The medical device may be, for example, a device used for the purpose of diagnosing, treating, relieving, curing, or preventing disease. For example, the medical device may be a device used for the purpose of diagnosing, treating, relieving, or correcting injury or impairment. For example, the medical device may be a device used for the purpose of inspecting, replacing, or modifying a structure or a function. For example, the medical device may be a device used for the purpose of adjusting pregnancy. For example, the medical device may include a device for treatment, a device for operation, a device for (in vitro) diagnosis, a hearing aid, or a device for procedure.

The security device may be, for example, a device installed to prevent a danger that may arise and to maintain safety. For example, the security device may be a camera, a closed-circuit TV (CCTV), a recorder, or a black box.

The FinTech device may be, for example, a device capable of providing a financial service such as mobile payment. For example, the FinTech device may include a payment device or a point of sales (POS) system.

The weather/environment device may include, for example, a device for monitoring or predicting a weather/environment.

The wireless devices 100*a* to 100*f* may be connected to the network 300 via the BSs 200. An AI technology may be applied to the wireless devices 100*a* to 100*f* and the wireless devices 100*a* to 100*f* may be connected to the AI server 400 via the network 300. The network 300 may be configured using a 3G network, a 4G (e.g., LTE) network, a 5G (e.g., NR) network, and a beyond-5G network. Although the wireless devices 100*a* to 100*f* may communicate with each other through the BSs 200/network 300, the wireless devices 100*a* to 100*f* may perform direct communication (e.g., sidelink communication) with each other without passing through the BSs 200/network 300. For example, the vehicles 100*b*-1 and 100*b*-2 may perform direct communication (e.g., vehicle-to-vehicle (V2V)/vehicle-to-everything (V2X) communication). The IoT device (e.g., a sensor) may perform direct communication with other IoT devices (e.g., sensors) or other wireless devices 100*a* to 100*f*.

Wireless communication/connections 150*a*, 150*b* and 150*c* may be established between the wireless devices 100*a* to 100*f* and/or between wireless device 100*a* to 100*f* and BS 200 and/or between BSs 200. Herein, the wireless communication/connections may be established through various RATs (e.g., 5G NR) such as uplink/downlink communication 150*a*, sidelink communication (or device-to-device (D2D) communication) 150*b*, inter-base station communication 150*c* (e.g., relay, integrated access and backhaul (IAB)), etc. The wireless devices 100*a* to 100*f* and the BSs 200/the wireless devices 100*a* to 100*f* may transmit/receive radio signals to/from each other through the wireless communication/connections 150*a*, 150*b* and 150*c*. For example, the wireless communication/connections 150*a*, 150*b* and 150*c* may transmit/receive signals through various physical channels. To this end, at least a part of various configuration information configuring processes, various signal processing processes (e.g., channel encoding/decoding, modulation/demodulation, and resource mapping/de-mapping), and resource allocating processes, for transmitting/receiving radio signals, may be performed based on the various proposals of the present disclosure.

Figure 2:
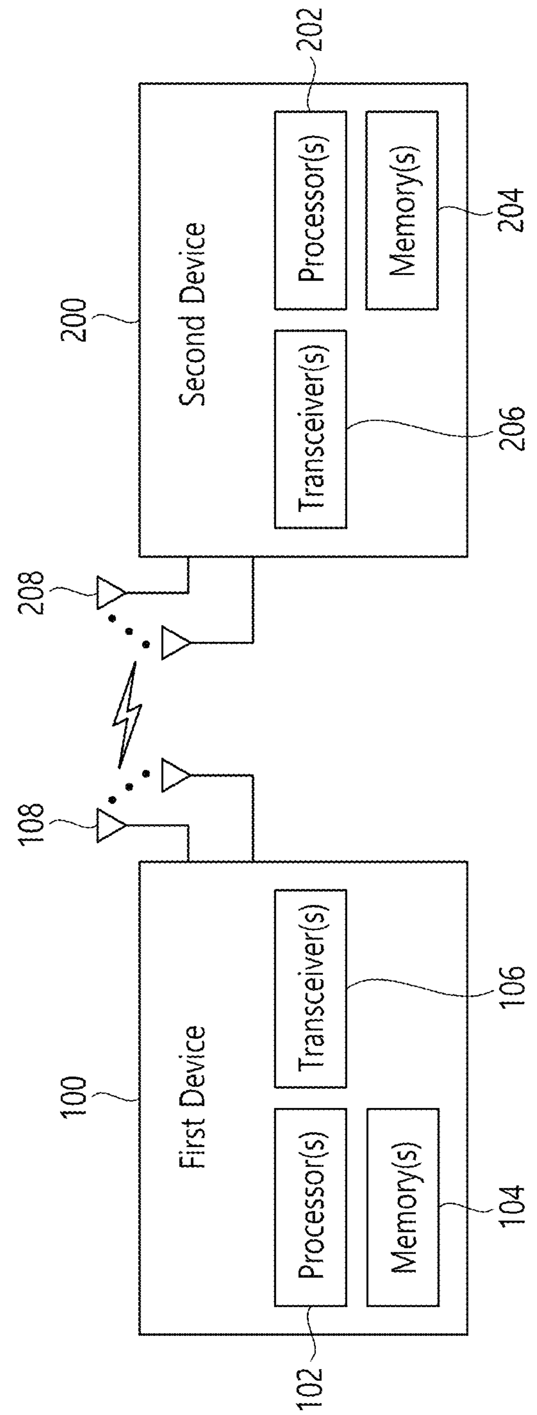
FIG. 2 shows an example of wireless devices to which implementations of the present disclosure is applied.

FIG. 2 shows an example of wireless devices to which implementations of the present disclosure is applied.

Referring to FIG. 2, a first wireless device 100 and a second wireless device 200 may transmit/receive radio signals to/from an external device through a variety of RATs (e.g., LTE and NR). In FIG. 2, {the first wireless device 100 and the second wireless device 200} may correspond to at least one of {the wireless device 100*a* to 100*f* and the BS 200}, {the wireless device 100*a* to 100*f* and the wireless device 100*a* to 100*f*} and/or {the BS 200 and the BS 200} of FIG. 1.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, suggestions, methods and/or operational flowcharts described in the present disclosure. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver(s) 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, suggestions, methods and/or operational flowcharts described in the present disclosure. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with radio frequency (RF) unit(s). In the present disclosure, the first wireless device 100 may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, suggestions, methods and/or operational flowcharts described in the present disclosure. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, suggestions, methods and/or operational flowcharts described in the present disclosure. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the second wireless device 200 may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as physical (PHY) layer, media access control (MAC) layer, radio link control (RLC) layer, packet data convergence protocol (PDCP) layer, radio resource control (RRC) layer, and service data adaptation protocol (SDAP) layer). The one or more processors 102 and 202 may generate one or more protocol data units (PDUs) and/or one or more service data unit (SDUs) according to the descriptions, functions, procedures, suggestions, methods and/or operational flowcharts disclosed in the present disclosure. The one or more processors 102 and 202 may generate messages, control information, data, or information according to the descriptions, functions, procedures, suggestions, methods and/or operational flowcharts disclosed in the present disclosure. The one or more processors 102 and 202 may generate signals (e.g., baseband signals) including PDUs, SDUs, messages, control information, data, or information according to the descriptions, functions, procedures, suggestions, methods and/or operational flowcharts disclosed in the present disclosure and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, suggestions, methods and/or operational flowcharts disclosed in the present disclosure.

The one or more processors 102 and 202 may be referred to as controllers, microcontrollers, microprocessors, or microcomputers. The one or more processors 102 and 202 may be implemented by hardware, firmware, software, or a combination thereof. As an example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. descriptions, functions, procedures, suggestions, methods and/or operational flowcharts disclosed in the present disclosure may be implemented using firmware or software and the firmware or software may be configured to include the modules, procedures, or functions. Firmware or software configured to perform the descriptions, functions, procedures, suggestions, methods and/or operational flowcharts disclosed in the present disclosure may be included in the one or more processors 102 and 202 or stored in the one or more memories 104 and 204 so as to be driven by the one or more processors 102 and 202. The descriptions, functions, procedures, suggestions, methods and/or operational flowcharts disclosed in the present disclosure may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the descriptions, functions, procedures, suggestions, methods and/or operational flowcharts disclosed in the present disclosure, to one or more other devices. The one or more transceivers 106 and 206 may receive user data, control information, and/or radio signals/channels, mentioned in the descriptions, functions, procedures, suggestions, methods and/or operational flowcharts disclosed in the present disclosure, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices.

The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, suggestions, methods and/or operational flowcharts disclosed in the present disclosure, through the one or more antennas 108 and 208. In the present disclosure, the one or more antennas may be a plurality of physical antennas or a plurality of logical antennas (e.g., antenna ports).

The one or more transceivers 106 and 206 may convert received radio signals/channels, etc., from RF band signals into baseband signals in order to process received user data, control information, radio signals/channels, etc., using the one or more processors 102 and 202. The one or more transceivers 106 and 206 may convert the user data, control information, radio signals/channels, etc., processed using the one or more processors 102 and 202 from the base band signals into the RF band signals. To this end, the one or more transceivers 106 and 206 may include (analog) oscillators and/or filters. For example, the transceivers 106 and 206 can up-convert OFDM baseband signals to a carrier frequency by their (analog) oscillators and/or filters under the control of the processors 102 and 202 and transmit the up-converted OFDM signals at the carrier frequency. The transceivers 106 and 206 may receive OFDM signals at a carrier frequency and down-convert the OFDM signals into OFDM baseband signals by their (analog) oscillators and/or filters under the control of the transceivers 102 and 202.

In the implementations of the present disclosure, a UE may operate as a transmitting device in uplink (UL) and as a receiving device in downlink (DL). In the implementations of the present disclosure, a BS may operate as a receiving device in UL and as a transmitting device in DL. Hereinafter, for convenience of description, it is mainly assumed that the first wireless device 100 acts as the UE, and the second wireless device 200 acts as the BS. For example, the processor(s) 102 connected to, mounted on or launched in the first wireless device 100 may be configured to perform the UE behavior according to an implementation of the present disclosure or control the transceiver(s) 106 to perform the UE behavior according to an implementation of the present disclosure. The processor(s) 202 connected to, mounted on or launched in the second wireless device 200 may be configured to perform the BS behavior according to an implementation of the present disclosure or control the transceiver(s) 206 to perform the BS behavior according to an implementation of the present disclosure.

In the present disclosure, a BS is also referred to as a node B (NB), an eNode B (eNB), or a gNB.

Figure 3:
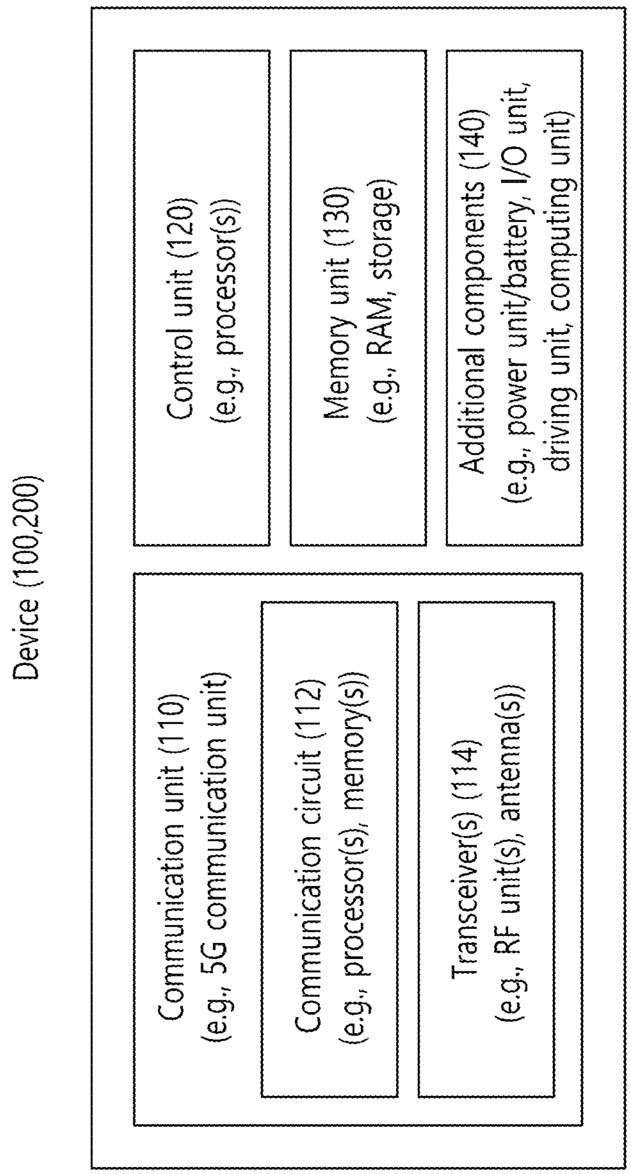
FIG. 3 shows an example of a wireless device to which implementations of the present disclosure is applied.

FIG. 3 shows an example of a wireless device to which implementations of the present disclosure is applied.

The wireless device may be implemented in various forms according to a use-case/service (refer to FIG. 1).

Referring to FIG. 3, wireless devices 100 and 200 may correspond to the wireless devices 100 and 200 of FIG. 2 and may be configured by various elements, components, units/portions, and/or modules. For example, each of the wireless devices 100 and 200 may include a communication unit 110, a control unit 120, a memory unit 130, and additional components 140. The communication unit 110 may include a communication circuit 112 and transceiver(s) 114. For example, the communication circuit 112 may include the one or more processors 102 and 202 of FIG. 2 and/or the one or more memories 104 and 204 of FIG. 2. For example, the transceiver(s) 114 may include the one or more transceivers 106 and 206 of FIG. 2 and/or the one or more antennas 108 and 208 of FIG. 2. The control unit 120 is electrically connected to the communication unit 110, the memory 130, and the additional components 140 and controls overall operation of each of the wireless devices 100 and 200. For example, the control unit 120 may control an electric/mechanical operation of each of the wireless devices 100 and 200 based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of the wireless devices 100 and 200. For example, the additional components 140 may include at least one of a power unit/battery, input/output (I/O) unit (e.g., audio I/O port, video I/O port), a driving unit, and a computing unit. The wireless devices 100 and 200 may be implemented in the form of, without being limited to, the robot (100*a* of FIG. 1), the vehicles (100*b*-1 and 100*b*-2 of FIG. 1), the XR device (100*c* of FIG. 1), the hand-held device (100*d* of FIG. 1), the home appliance (100*e* of FIG. 1), the IoT device (100*f* of FIG. 1), a digital broadcast terminal, a hologram device, a public safety device, an MTC device, a medicine device, a FinTech device (or a finance device), a security device, a climate/environment device, the AI server/device (400 of FIG. 1), the BSs (200 of FIG. 1), a network node, etc. The wireless devices 100 and 200 may be used in a mobile or fixed place according to a use-example/service.

In FIG. 3, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor (AP), an electronic control unit (ECU), a graphical processing unit, and a memory control processor. As another example, the memory 130 may be configured by a RAM, a DRAM, a ROM, a flash memory, a volatile memory, a non-volatile memory, and/or a combination thereof.

Figure 4:
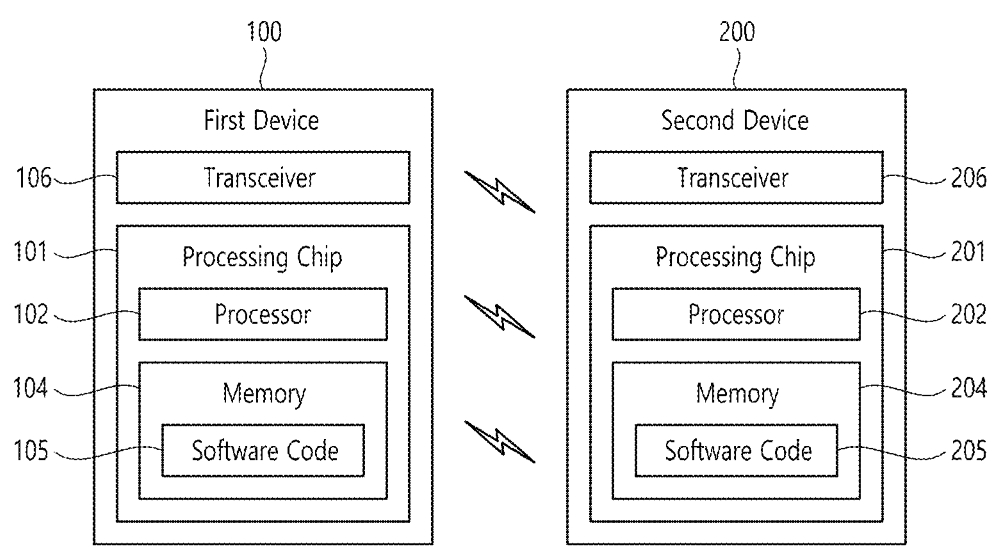
FIG. 4 shows another example of wireless devices to which implementations of the present disclosure is applied.

FIG. 4 shows another example of wireless devices to which implementations of the present disclosure is applied.

Referring to FIG. 4, wireless devices 100 and 200 may correspond to the wireless devices 100 and 200 of FIG. 2 and may be configured by various elements, components, units/portions, and/or modules.

The first wireless device 100 may include at least one transceiver, such as a transceiver 106, and at least one processing chip, such as a processing chip 101. The processing chip 101 may include at least one processor, such a processor 102, and at least one memory, such as a memory 104. The memory 104 may be operably connectable to the processor 102. The memory 104 may store various types of information and/or instructions. The memory 104 may store a software code 105 which implements instructions that, when executed by the processor 102, perform the descriptions, functions, procedures, suggestions, methods and/or operational flowcharts disclosed in the present disclosure. For example, the software code 105 may implement instructions that, when executed by the processor 102, perform the descriptions, functions, procedures, suggestions, methods and/or operational flowcharts disclosed in the present disclosure. For example, the software code 105 may control the processor 102 to perform one or more protocols. For example, the software code 105 may control the processor 102 may perform one or more layers of the radio interface protocol.

The second wireless device 200 may include at least one transceiver, such as a transceiver 206, and at least one processing chip, such as a processing chip 201. The processing chip 201 may include at least one processor, such a processor 202, and at least one memory, such as a memory 204. The memory 204 may be operably connectable to the processor 202. The memory 204 may store various types of information and/or instructions. The memory 204 may store a software code 205 which implements instructions that, when executed by the processor 202, perform the descriptions, functions, procedures, suggestions, methods and/or operational flowcharts disclosed in the present disclosure. For example, the software code 205 may implement instructions that, when executed by the processor 202, perform the descriptions, functions, procedures, suggestions, methods and/or operational flowcharts disclosed in the present disclosure. For example, the software code 205 may control the processor 202 to perform one or more protocols. For example, the software code 205 may control the processor 202 may perform one or more layers of the radio interface protocol.

Figure 5:
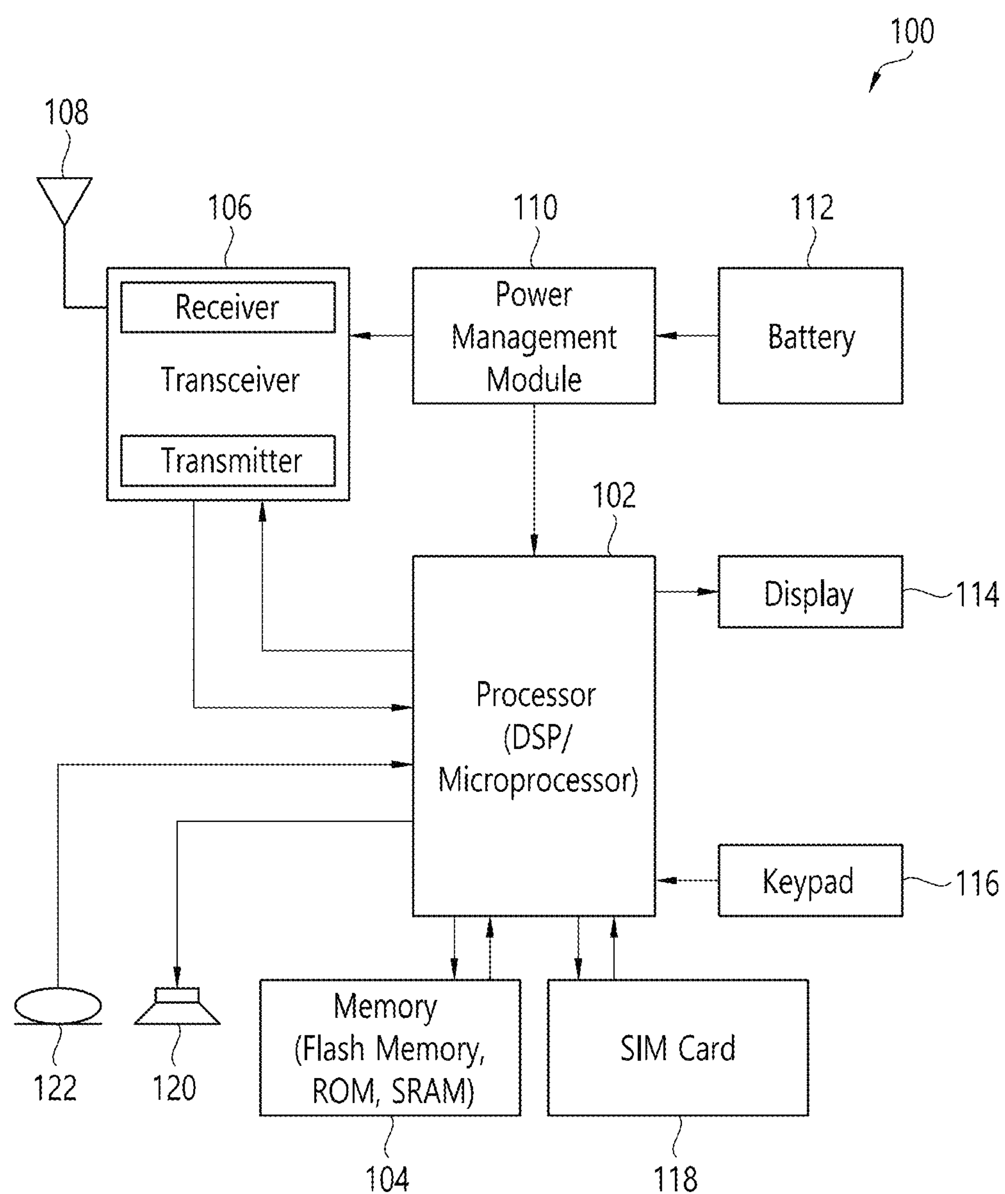
FIG. 5 shows an example of UE to which implementations of the present disclosure is applied.

FIG. 5 shows an example of UE to which implementations of the present disclosure is applied.

Referring to FIG. 5, a UE 100 may correspond to the first wireless device 100 of FIG. 2 and/or the first wireless device 100 of FIG. 4.

A UE 100 includes a processor 102, a memory 104, a transceiver 106, one or more antennas 108, a power management module 110, a battery 1112, a display 114, a keypad 116, a subscriber identification module (SIM) card 118, a speaker 120, and a microphone 122.

The processor 102 may be configured to implement the descriptions, functions, procedures, suggestions, methods and/or operational flowcharts disclosed in the present disclosure. The processor 102 may be configured to control one or more other components of the UE 100 to implement the descriptions, functions, procedures, suggestions, methods and/or operational flowcharts disclosed in the present disclosure. Layers of the radio interface protocol may be implemented in the processor 102. The processor 102 may include ASIC, other chipset, logic circuit and/or data processing device. The processor 102 may be an application processor. The processor 102 may include at least one of a digital signal processor (DSP), a central processing unit (CPU), a graphics processing unit (GPU), a modem (modulator and demodulator). An example of the processor 102 may be found in SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or a corresponding next generation processor.

The memory 104 is operatively coupled with the processor 102 and stores a variety of information to operate the processor 102. The memory 104 may include ROM, RAM, flash memory, memory card, storage medium and/or other storage device. When the embodiments are implemented in software, the techniques described herein can be implemented with modules (e.g., procedures, functions, etc.) that perform the descriptions, functions, procedures, suggestions, methods and/or operational flowcharts disclosed in the present disclosure. The modules can be stored in the memory 104 and executed by the processor 102. The memory 104 can be implemented within the processor 102 or external to the processor 102 in which case those can be communicatively coupled to the processor 102 via various means as is known in the art.

The transceiver 106 is operatively coupled with the processor 102, and transmits and/or receives a radio signal. The transceiver 106 includes a transmitter and a receiver. The transceiver 106 may include baseband circuitry to process radio frequency signals. The transceiver 106 controls the one or more antennas 108 to transmit and/or receive a radio signal.

The power management module 110 manages power for the processor 102 and/or the transceiver 106. The battery 112 supplies power to the power management module 110.

The display 114 outputs results processed by the processor 102. The keypad 116 receives inputs to be used by the processor 102. The keypad 16 may be shown on the display 114.

The SIM card 118 is an integrated circuit that is intended to securely store the international mobile subscriber identity (IMSI) number and its related key, which are used to identify and authenticate subscribers on mobile telephony devices (such as mobile phones and computers). It is also possible to store contact information on many SIM cards.

The speaker 120 outputs sound-related results processed by the processor 102. The microphone 122 receives sound-related inputs to be used by the processor 102.

Figure 6:
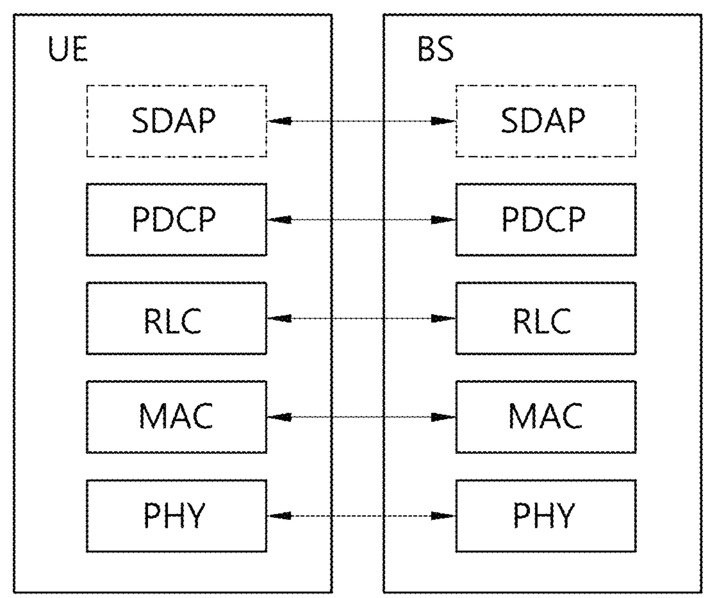
FIGS. 6 and 7 show an example of protocol stacks in a 3GPP based wireless communication system to which implementations of the present disclosure is applied.
Figure 7:
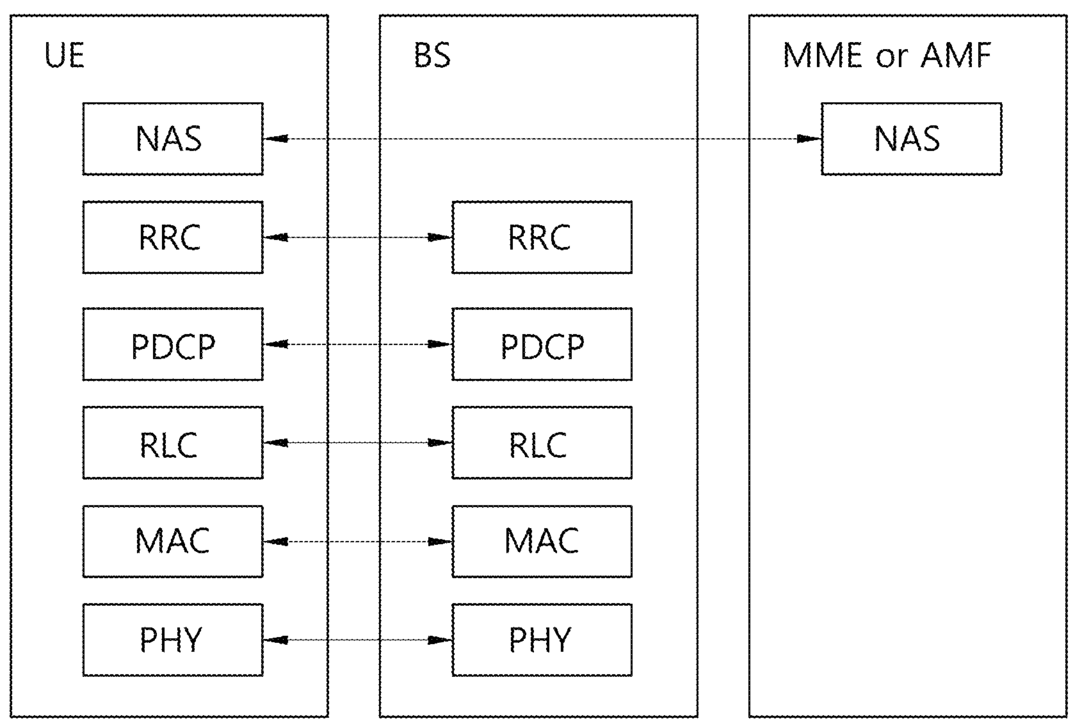

FIGS. 6 and 7 show an example of protocol stacks in a 3GPP based wireless communication system to which implementations of the present disclosure is applied.

In particular, FIG. 6 illustrates an example of a radio interface user plane protocol stack between a UE and a BS and FIG. 7 illustrates an example of a radio interface control plane protocol stack between a UE and a BS. The control plane refers to a path through which control messages used to manage call by a UE and a network are transported. The user plane refers to a path through which data generated in an application layer, for example, voice data or Internet packet data are transported. Referring to FIG. 6, the user plane protocol stack may be divided into Layer 1 (i.e., a PHY layer) and Layer 2. Referring to FIG. 7, the control plane protocol stack may be divided into Layer 1 (i.e., a PHY layer), Layer 2, Layer 3 (e.g., an RRC layer), and a non-access stratum (NAS) layer. Layer 1, Layer 2 and Layer 3 are referred to as an access stratum (AS).

In the 3GPP LTE system, the Layer 2 is split into the following sublayers: MAC, RLC, and PDCP. In the 3GPP NR system, the Layer 2 is split into the following sublayers: MAC, RLC, PDCP and SDAP. The PHY layer offers to the MAC sublayer transport channels, the MAC sublayer offers to the RLC sublayer logical channels, the RLC sublayer offers to the PDCP sublayer RLC channels, the PDCP sublayer offers to the SDAP sublayer radio bearers. The SDAP sublayer offers to 5G core network quality of service (QoS) flows.

In the 3GPP NR system, the main services and functions of the MAC sublayer include: mapping between logical channels and transport channels; multiplexing/de-multiplexing of MAC SDUs belonging to one or different logical channels into/from transport blocks (TB) delivered to/from the physical layer on transport channels; scheduling information reporting; error correction through hybrid automatic repeat request (HARQ) (one HARQ entity per cell in case of carrier aggregation (CA)); priority handling between UEs by means of dynamic scheduling; priority handling between logical channels of one UE by means of logical channel prioritization; padding. A single MAC entity may support multiple numerologies, transmission timings and cells. Mapping restrictions in logical channel prioritization control which numerology(ies), cell(s), and transmission timing(s) a logical channel can use.

Different kinds of data transfer services are offered by MAC. To accommodate different kinds of data transfer services, multiple types of logical channels are defined, i.e., each supporting transfer of a particular type of information. Each logical channel type is defined by what type of information is transferred. Logical channels are classified into two groups: control channels and traffic channels. Control channels are used for the transfer of control plane information only, and traffic channels are used for the transfer of user plane information only. Broadcast control channel (BCCH) is a downlink logical channel for broadcasting system control information, paging control channel (PCCH) is a downlink logical channel that transfers paging information, system information change notifications and indications of ongoing public warning service (PWS) broadcasts, common control channel (CCCH) is a logical channel for transmitting control information between UEs and network and used for UEs having no RRC connection with the network, and dedicated control channel (DCCH) is a point-to-point bi-directional logical channel that transmits dedicated control information between a UE and the network and used by UEs having an RRC connection. Dedicated traffic channel (DTCH) is a point-to-point logical channel, dedicated to one UE, for the transfer of user information. A DTCH can exist in both uplink and downlink. In downlink, the following connections between logical channels and transport channels exist: BCCH can be mapped to broadcast channel (BCH); BCCH can be mapped to downlink shared channel (DL-SCH); PCCH can be mapped to paging channel (PCH); CCCH can be mapped to DL-SCH; DCCH can be mapped to DL-SCH; and DTCH can be mapped to DL-SCH. In uplink, the following connections between logical channels and transport channels exist: CCCH can be mapped to uplink shared channel (UL-SCH); DCCH can be mapped to UL-SCH; and DTCH can be mapped to UL-SCH.

The RLC sublayer supports three transmission modes: transparent mode (TM), unacknowledged mode (UM), and acknowledged node (AM). The RLC configuration is per logical channel with no dependency on numerologies and/or transmission durations. In the 3GPP NR system, the main services and functions of the RLC sublayer depend on the transmission mode and include: transfer of upper layer PDUs; sequence numbering independent of the one in PDCP (UM and AM); error correction through ARQ (AM only); segmentation (AM and UM) and re-segmentation (AM only) of RLC SDUs; reassembly of SDU (AM and UM); duplicate detection (AM only); RLC SDU discard (AM and UM); RLC re-establishment; protocol error detection (AM only).

In the 3GPP NR system, the main services and functions of the PDCP sublayer for the user plane include: sequence numbering; header compression and decompression using robust header compression (ROHC); transfer of user data; reordering and duplicate detection; in-order delivery; PDCP PDU routing (in case of split bearers); retransmission of PDCP SDUs; ciphering, deciphering and integrity protection; PDCP SDU discard; PDCP re-establishment and data recovery for RLC AM; PDCP status reporting for RLC AM; duplication of PDCP PDUs and duplicate discard indication to lower layers. The main services and functions of the PDCP sublayer for the control plane include: sequence numbering; ciphering, deciphering and integrity protection; transfer of control plane data; reordering and duplicate detection; in-order delivery; duplication of PDCP PDUs and duplicate discard indication to lower layers.

In the 3GPP NR system, the main services and functions of SDAP include: mapping between a QoS flow and a data radio bearer; marking QoS flow ID (QFI) in both DL and UL packets. A single protocol entity of SDAP is configured for each individual PDU session.

In the 3GPP NR system, the main services and functions of the RRC sublayer include: broadcast of system information related to AS and NAS; paging initiated by 5GC or NG-RAN; establishment, maintenance and release of an RRC connection between the UE and NG-RAN; security functions including key management; establishment, configuration, maintenance and release of signaling radio bearers (SRBs) and data radio bearers (DRBs); mobility functions (including: handover and context transfer, UE cell selection and reselection and control of cell selection and reselection, inter-RAT mobility); QoS management functions; UE measurement reporting and control of the reporting; detection of and recovery from radio link failure; NAS message transfer to/from NAS from/to UE.

Figure 8:
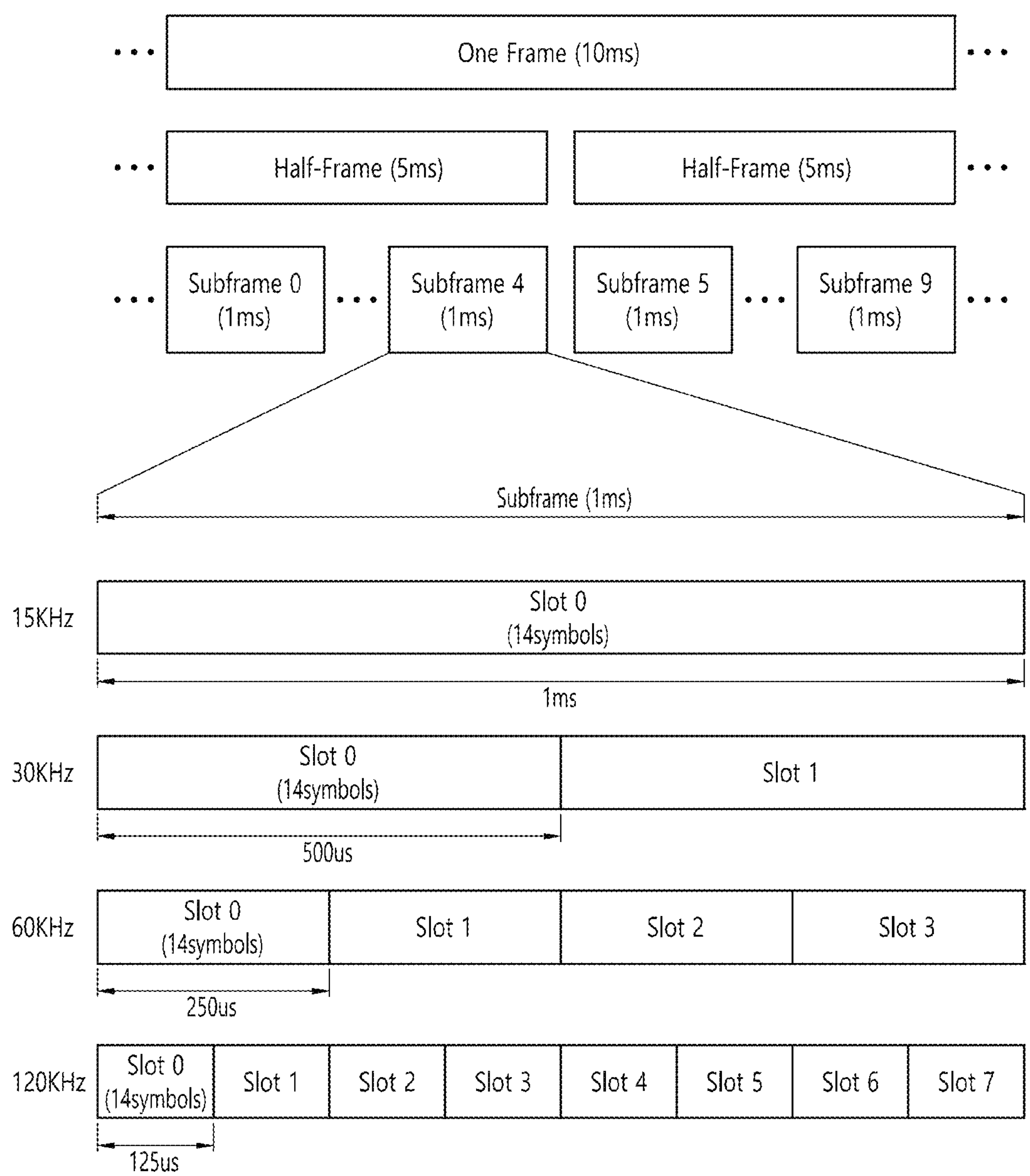
FIG. 8 shows a frame structure in a 3GPP based wireless communication system to which implementations of the present disclosure is applied.

FIG. 8 shows a frame structure in a 3GPP based wireless communication system to which implementations of the present disclosure is applied.

The frame structure shown in FIG. 8 is purely exemplary and the number of subframes, the number of slots, and/or the number of symbols in a frame may be variously changed. In the 3GPP based wireless communication system, OFDM numerologies (e.g., subcarrier spacing (SCS), transmission time interval (TTI) duration) may be differently configured between a plurality of cells aggregated for one UE. For example, if a UE is configured with different SCSs for cells aggregated for the cell, an (absolute time) duration of a time resource (e.g., a subframe, a slot, or a TTI) including the same number of symbols may be different among the aggregated cells. Herein, symbols may include OFDM symbols (or CP-OFDM symbols), SC-FDMA symbols (or discrete Fourier transform-spread-OFDM (DFT-s-OFDM) symbols).

Referring to FIG. 8, downlink and uplink transmissions are organized into frames. Each frame has $T_f$=10 ms duration. Each frame is divided into two half-frames, where each of the half-frames has 5 ms duration. Each half-frame consists of 5 subframes, where the duration $T_{sf}$ per subframe is 1 ms. Each subframe is divided into slots and the number of slots in a subframe depends on a subcarrier spacing. Each slot includes 14 or 12 OFDM symbols based on a cyclic prefix (CP). In a normal CP, each slot includes 14 OFDM symbols and, in an extended CP, each slot includes 12 OFDM symbols. The numerology is based on exponentially scalable subcarrier spacing $\Delta f=2^u*15$ kHz.

Table 1 shows the number of OFDM symbols per slot $N^{slot}_{symb}$, the number of slots per frame $N^{frame,u}_{slot}$, and the number of slots per subframe $N^{subframe,u}_{slot}$ for the normal CP, according to the subcarrier spacing $\Delta f=2^u*15$ kHz.

TABLE 1

| u | $N^{slot}_{symb}$ | $N^{frame,u}_{slot}$ | $N^{subframe,u}_{slot}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

Table 2 shows the number of OFDM symbols per slot $N^{slot}_{symb}$, the number of slots per frame $N^{frame,u}_{slot}$, and the number of slots per subframe $N^{subframe,u}_{slot}$ for the extended CP, according to the subcarrier spacing $\Delta f=2^u*15$ kHz.

TABLE 2

| | $N^{slot}_{symb}$ | $N^{frame,u}_{slot}$ | $N^{subframe,u}_{slot}$ |
|---|---|---|---|
| 2 | 12 | 40 | 4 |

A slot includes plural symbols (e.g., 14 or 12 symbols) in the time domain. For each numerology (e.g., subcarrier spacing) and carrier, a resource grid of $N^{size,u}_{grid,x}*N^{RB}_{sc}$ subcarriers and $N^{subframe,u}_{symb}$ OFDM symbols is defined, starting at common resource block (CRB) $N^{start,u}_{grid}$ indicated by higher-layer signaling (e.g., RRC signaling), where $N^{size,u}_{grid,x}$ is the number of resource blocks (RBs) in the resource grid and the subscript x is DL for downlink and UL for uplink. $N^{RB}_{sc}$ is the number of subcarriers per RB. In the 3GPP based wireless communication system, $N^{RB}_{sc}$ is 12 generally. There is one resource grid for a given antenna port p, subcarrier spacing configuration u, and transmission direction (DL or UL). The carrier bandwidth $N^{size,u}_{grid}$ for subcarrier spacing configuration u is given by the higher-layer parameter (e.g., RRC parameter). Each element in the resource grid for the antenna port p and the subcarrier spacing configuration u is referred to as a resource element (RE) and one complex symbol may be mapped to each RE. Each RE in the resource grid is uniquely identified by an index k in the frequency domain and an index l representing a symbol location relative to a reference point in the time domain. In the 3GPP based wireless communication system, an RB is defined by 12 consecutive subcarriers in the frequency domain.

In the 3GPP NR system, RBs are classified into CRBs and physical resource blocks (PRBs). CRBs are numbered from 0 and upwards in the frequency domain for subcarrier spacing configuration u. The center of subcarrier 0 of CRB 0 for subcarrier spacing configuration u coincides with ‘point A’ which serves as a common reference point for resource block grids. In the 3GPP NR system, PRBs are defined within a bandwidth part (BWP) and numbered from 0 to $N^{size}_{Bwp,i}-1$, where i is the number of the bandwidth part. The relation between the physical resource block $n_{PRB}$ in the bandwidth part i and the common resource block $n_{CRB}$ is as follows: $n_{PRB}=n_{CRB}+N^{size}_{BWP,i}$, where $N^{size}_{BWP,i}$ is the common resource block where bandwidth part starts relative to CRB 0. The BWP includes a plurality of consecutive RBs. A carrier may include a maximum of N (e.g., 5) BWPs. A UE may be configured with one or more BWPs on a given component carrier. Only one BWP among BWPs configured to the UE can active at a time. The active BWP defines the UE’s operating bandwidth within the cell’s operating bandwidth.

The NR frequency band may be defined as two types of frequency range, i.e., FR1 and FR2. The numerical value of the frequency range may be changed. For example, the frequency ranges of the two types (FR1 and FR2) may be as shown in Table 3 below. For ease of explanation, in the frequency ranges used in the NR system, FR1 may mean “sub 6 GHz range”, FR2 may mean “above 6 GHz range,” and may be referred to as millimeter wave (mmW).

TABLE 3

| Frequency Range designation | Corresponding frequency range | Subcarrier Spacing |
|---|---|---|
| FR1 | 450 MHz-6000 MHz | 15, 30, 60 KHz |
| FR2 | 24250 MHz-52600 MHZ | 60, 120, 240 KHz |

As mentioned above, the numerical value of the frequency range of the NR system may be changed. For example, FR1 may include a frequency band of 410 MHz to 7125 MHz as shown in Table 4 below. That is, FR1 may include a frequency band of 6 GHz (or 5850, 5900, 5925 MHz, etc.) or more. For example, a frequency band of 6 GHz (or 5850, 5900, 5925 MHz, etc.) or more included in FR1 may include an unlicensed band. Unlicensed bands may be used for a variety of purposes, for example for communication for vehicles (e.g., autonomous driving).

TABLE 4

| Frequency Range designation | Corresponding frequency range | Subcarrier Spacing |
|---|---|---|
| FR1 | 410 MHz-7125 MHz | 15, 30, 60 KHz |
| FR2 | 24250 MHz-52600 MHZ | 60, 120, 240 KHz |

In the present disclosure, the term "cell" may refer to a geographic area to which one or more nodes provide a communication system, or refer to radio resources. A "cell" as a geographic area may be understood as coverage within which a node can provide service using a carrier and a "cell" as radio resources (e.g., time-frequency resources) is associated with bandwidth which is a frequency range configured by the carrier. The "cell" associated with the radio resources is defined by a combination of downlink resources and uplink resources, for example, a combination of a DL component carrier (CC) and a UL CC. The cell may be configured by downlink resources only, or may be configured by downlink resources and uplink resources. Since DL coverage, which is a range within which the node is capable of transmitting a valid signal, and UL coverage, which is a range within which the node is capable of receiving the valid signal from the UE, depends upon a carrier carrying the signal, the coverage of the node may be associated with coverage of the "cell" of radio resources used by the node. Accordingly, the term "cell" may be used to represent service coverage of the node sometimes, radio resources at other times, or a range that signals using the radio resources can reach with valid strength at other times.

In CA, two or more CCs are aggregated. A UE may simultaneously receive or transmit on one or multiple CCs depending on its capabilities. CA is supported for both contiguous and non-contiguous CCs. When CA is configured, the UE only has one RRC connection with the network. At RRC connection establishment/re-establishment/handover, one serving cell provides the NAS mobility information, and at RRC connection re-establishment/handover, one serving cell provides the security input. This cell is referred to as the primary cell (PCell). The PCell is a cell, operating on the primary frequency, in which the UE either performs the initial connection establishment procedure or initiates the connection re-establishment procedure. Depending on UE capabilities, secondary cells (SCells) can be configured to form together with the PCell a set of serving cells. An SCell is a cell providing additional radio resources on top of special cell (SpCell). The configured set of serving cells for a UE therefore always consists of one PCell and one or more SCells. For dual connectivity (DC) operation, the term SpCell refers to the PCell of the master cell group (MCG) or the primary SCell (PSCell) of the secondary cell group (SCG). An SpCell supports PUCCH transmission and contention-based random access, and is always activated. The MCG is a group of serving cells associated with a master node, comprised of the SpCell (PCell) and optionally one or more SCells. The SCG is the subset of serving cells associated with a secondary node, comprised of the PSCell and zero or more SCells, for a UE configured with DC. For a UE in RRC_CONNECTED not configured with CA/DC, there is only one serving cell comprised of the PCell. For a UE in RRC_CONNECTED configured with CA/DC, the term "serving cells" is used to denote the set of cells comprised of the SpCell(s) and all SCells. In DC, two MAC entities are configured in a UE: one for the MCG and one for the SCG.

Figure 9:
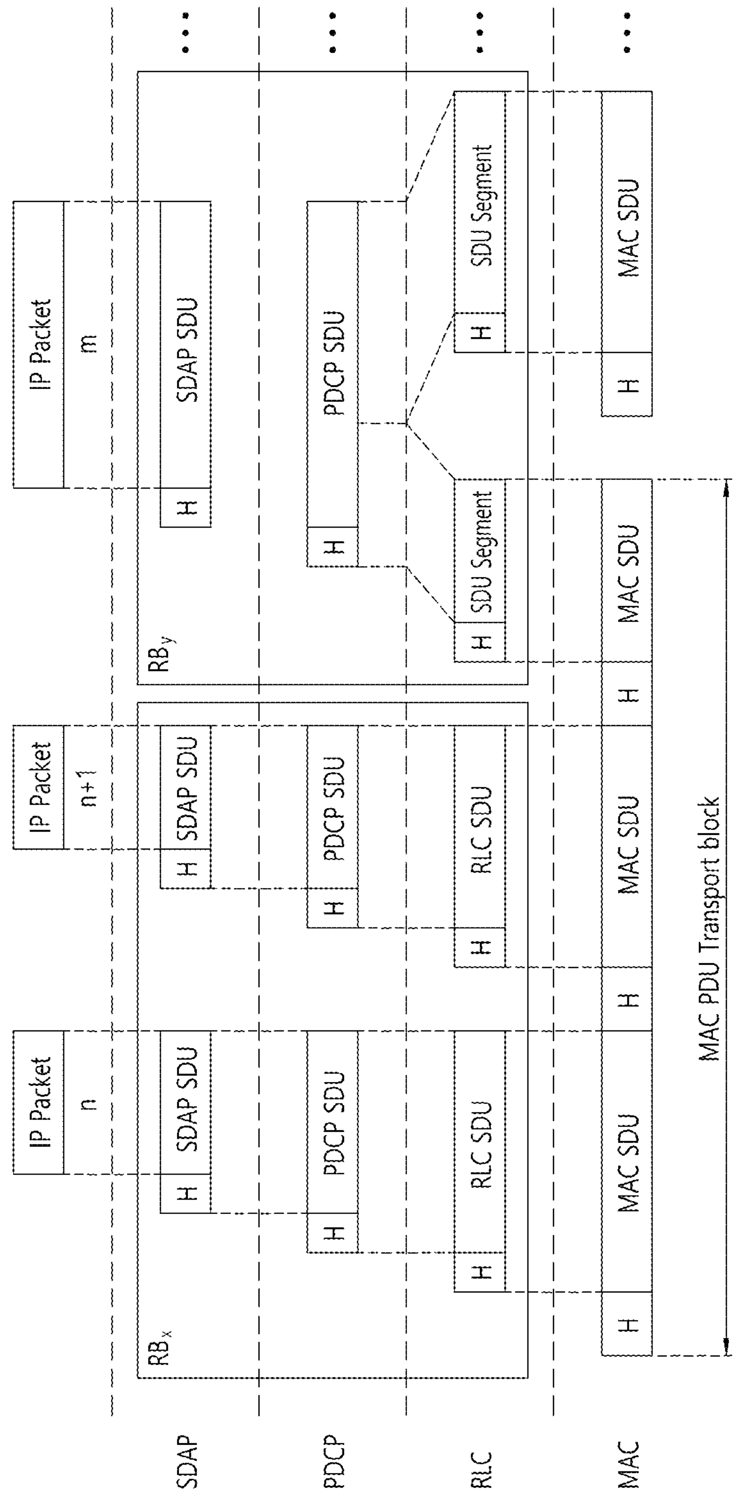
FIG. 9 shows a data flow example in the 3GPP NR system to which implementations of the present disclosure is applied.

FIG. 9 shows a data flow example in the 3GPP NR system to which implementations of the present disclosure is applied.

Referring to FIG. 9, "RB" denotes a radio bearer, and "H" denotes a header. Radio bearers are categorized into two groups: DRBs for user plane data and SRBs for control plane data. The MAC PDU is transmitted/received using radio resources through the PHY layer to/from an external device. The MAC PDU arrives to the PHY layer in the form of a transport block.

In the PHY layer, the uplink transport channels UL-SCH and RACH are mapped to their physical channels physical uplink shared channel (PUSCH) and physical random access channel (PRACH), respectively, and the downlink transport channels DL-SCH, BCH and PCH are mapped to physical downlink shared channel (PDSCH), physical broadcast channel (PBCH) and PDSCH, respectively. In the PHY layer, uplink control information (UCI) is mapped to physical uplink control channel (PUCCH), and downlink control information (DCI) is mapped to physical downlink control channel (PDCCH). A MAC PDU related to UL-SCH is transmitted by a UE via a PUSCH based on an UL grant, and a MAC PDU related to DL-SCH is transmitted by a BS via a PDSCH based on a DL assignment.

An RRC state indicates whether an RRC layer of the UE is logically connected to an RRC layer of the E-UTRAN. In LTE/LTE-A, when the RRC connection is established between the RRC layer of the UE and the RRC layer of the E-UTRAN, the UE is in the RRC connected state (RRC_CONNECTED). Otherwise, the UE is in the RRC idle state (RRC_IDLE). In NR, the RRC inactive state (RRC_INACTIVE) is additionally introduced. RRC_INACTIVE may be used for various purposes. For example, the massive machine type communications (MMTC) UEs can be efficiently managed in RRC_INACTIVE. When a specific condition is satisfied, transition is made from one of the above three states to the other.

A predetermined operation may be performed according to the RRC state. In RRC_IDLE, public land mobile network (PLMN) selection, broadcast of system information (SI), cell re-selection mobility, core network (CN) paging and discontinuous reception (DRX) configured by NAS may be performed. The UE shall have been allocated an identifier (ID) which uniquely identifies the UE in a tracking area. No RRC context stored in the BS.

In RRC_CONNECTED, the UE has an RRC connection with the network (i.e., E-UTRAN/NG-RAN). Network-CN connection (both C/U-planes) is also established for UE. The UE AS context is stored in the network and the UE. The RAN knows the cell which the UE belongs to. The network can transmit and/or receive data to/from UE. Network controlled mobility including measurement is also performed.

Most of operations performed in RRC_IDLE may be performed in RRC_INACTIVE. But, instead of CN paging in RRC_IDLE, RAN paging is performed in RRC_INACTIVE. In other words, in RRC_IDLE, paging for mobile terminated (MT) data is initiated by core network and paging area is managed by core network. In RRC_INACTIVE, paging is initiated by NG-RAN, and RAN-based notification area (RNA) is managed by NG-RAN. Further, instead of DRX for CN paging configured by NAS in RRC_IDLE, DRX for RAN paging is configured by NG-RAN in RRC_INACTIVE. Meanwhile, in RRC_INACTIVE, 5GC-NG-RAN connection (both C/U-planes) is established for UE, and the UE AS context is stored in NG-RAN and the UE. NG-RAN knows the RNA which the UE belongs to.

Sidelink (SL) UE information is described. Section 5.10.2 of 3GPP TS 36.331 V15.6.0 can be referred.

The purpose of this procedure is to inform E-UTRAN that the UE is interested or no longer interested to receive sidelink communication or discovery, to receive V2X sidelink communication, as well as to request assignment or release of transmission resources for sidelink communication or discovery announcements or V2X sidelink communication or sidelink discovery gaps, to report parameters related to sidelink discovery from system information of inter-frequency/PLMN cells and to report the synchronization reference used by the UE for V2X sidelink communication.

A UE capable of sidelink communication or V2X sidelink communication or sidelink discovery that is in RRC_CONNECTED may initiate the procedure to indicate it is (interested in) receiving sidelink communication or V2X sidelink communication or sidelink discovery in several cases including upon successful connection establishment, upon change of interest, upon change to a PCell broadcasting SystemInformationBlockType18 or SystemInformationBlockType19 or SystemInformationBlockType21 including sl-V2X-ConfigCommon. A UE capable of sidelink communication or V2X sidelink communication or sidelink discovery may initiate the procedure to request assignment of dedicated resources for the concerned sidelink communication transmission or discovery announcements or V2X sidelink communication transmission or to request sidelink discovery gaps for sidelink discovery transmission or sidelink discovery reception and a UE capable of inter-frequency/PLMN sidelink discovery parameter reporting may initiate the procedure to report parameters related to sidelink discovery from system information of inter-frequency/PLMN cells.

A UE in RRC_IDLE that is configured to transmit sidelink communication/V2X sidelink communication/sidelink discovery announcements, while SystemInformationBlockType181 SystemInformationBlockType191 SystemInformationBlockType21 including sl-V2X-ConfigCommon or SystemInformationBlockType26 does not include the resources for transmission (in normal conditions), initiates connection establishment.

Upon initiating the procedure, the UE shall:

1> if SystemInformationBlockType18 is broadcast by the PCell:

2> ensure having a valid version of SystemInformationBlockType18 for the PCell;

2> if configured by upper layers to receive sidelink communication:

3> if the UE did not transmit a SidelinkUEInformation message since last entering RRC_CONNECTED state; or 3> if since the last time the UE transmitted a SidelinkUEInformation message the UE connected to a PCell not broadcasting SystemInformationBlockType18; or After handover/re-establishment from a source PCell not broadcasting SystemInformationBlockType18, the UE repeats the same interest information that it provided previously as such a source PCell may not forward the interest information.

3> if the last transmission of the SidelinkUEInformation message did not include commRxInterestedFreq; or if the frequency configured by upper layers to receive sidelink communication on has changed since the last transmission of the SidelinkUEInformation message:

4> initiate transmission of the SidelinkUEInformation message to indicate the sidelink communication reception frequency of interest;

2> else:

3> if the last transmission of the SidelinkUEInformation message included commRxInterestedFreq:

4> initiate transmission of the SidelinkUEInformation message to indicate it is no longer interested in sidelink communication reception;

2> if configured by upper layers to transmit non-relay related one-to-many sidelink communication:

3> if the UE did not transmit a SidelinkUEInformation message since last entering RRC_CONNECTED state; or 3> if since the last time the UE transmitted a SidelinkUEInformation message the UE connected to a PCell not broadcasting SystemInformationBlockType18; or 3> if the last transmission of the SidelinkUEInformation message did not include commTxResourceReq; or if the information carried by the commTxResourceReq has changed since the last transmission of the SidelinkUEInformation message:

4> initiate transmission of the SidelinkUEInformation message to indicate the non-relay related one-to-many sidelink communication transmission resources required by the UE;

2> else:

3> if the last transmission of the SidelinkUEInformation message included commTxResourceReq:

4> initiate transmission of the SidelinkUEInformation message to indicate it no longer requires non-relay related one-to-many sidelink communication transmission resources;

2> if configured by upper layer to transmit relay related one-to-many sidelink communication:

3> if the UE did not transmit a SidelinkUEInformation message since entering RRC_CONNECTED state; or 3> if since the last time the UE transmitted a SidelinkUEInformation message the UE connected to a PCell not broadcasting SystemInformationBlockType18, connected to a PCell not broadcasting SystemInformationBlockType19 or broadcasting SystemInformationBlockType19 not including discConfigRelay; or 3> if the last transmission of SidelinkUEInformation message did not include commTxResourceReqRelay; or if the information carried by the commTxResourceReqRelay has changed since the last transmission of the SidelinkUEInformation message:

4> if the UE is acting as sidelink relay UE:

5> initiate transmission of the SidelinkUEInformation message to indicate the relay related one-to-many sidelink communication transmission resources required by the UE;

2> else:

3> if the last transmission of the SidelinkUEInformation message included commTxResourceReqRelay:

4> initiate transmission of the SidelinkUEInformation message to indicate it no longer requires relay related one-to-many sidelink communication transmission resources;

2> if configured by upper layers to transmit non-relay related one-to-one sidelink communication:

3> if the UE did not transmit a SidelinkUEInformation message since last entering RRC_CONNECTED state; or 3> if since the last time the UE transmitted a SidelinkUE-Information message the UE connected to a PCell not broadcasting SystemInformationBlockType18 or connected to a PCell broadcasting SystemInformation-BlockType18 not including commTxResourceUC-ReqAllowed; or 3> if the last transmission of the SidelinkUEInformation message did not include commTxResourceReqUC; or if the information carried by the commTxResourceReqUC has changed since the last transmission of the SidelinkUEInformation message:

4> if commTxResourceUC-ReqAllowed is included in SystemInformationBlockType18:

5> initiate transmission of the SidelinkUEInformation message to indicate the non-relay related one-to-one sidelink communication transmission resources required by the UE;

2> else:

3> if the last transmission of the SidelinkUEInformation message included commTxResourceReqUC:

4> initiate transmission of the SidelinkUEInformation message to indicate it no longer requires non-relay related one-to-one sidelink communication transmission resources;

2> if configured by upper layers to transmit relay related one-to-one sidelink communication:

3> if the UE did not transmit a SidelinkUEInformation message since last entering RRC_CONNECTED state; or 3> if since the last time the UE transmitted a SidelinkUE-Information message the UE connected to a PCell not broadcasting SystemInformationBlockType18, connected to a PCell not broadcasting SystemInformation-BlockType19 or broadcasting SystemInformation-BlockType19 not including discConfigRelay; or 3> if the last transmission of the SidelinkUEInformation message did not include commTxResourceReqRelayUC; or if the information carried by the commTxResourceReqRelayUC has changed since the last transmission of the SidelinkUEInformation message:

4> if the UE is acting as sidelink relay UE; or

4> if the UE has a selected sidelink relay UE; and if SystemInformationBlockType19 is broadcast by the PCell and includes discConfigRelay; and if the sidelink remote UE threshold conditions are met;

5> initiate transmission of the SidelinkUEInformation message to indicate the relay related one-to-one sidelink communication transmission resources required by the UE;

2> else:

3> if the last transmission of the SidelinkUEInformation message included commTxResourceReqRelayUC:

4> initiate transmission of the SidelinkUEInformation message to indicate it no longer requires relay related one-to-one sidelink communication transmission resources;

1> if SystemInformationBlockType19 is broadcast by the PCell:

2> ensure having a valid version of SystemInformation-BlockType19 for the PCell;

2> if configured by upper layers to receive sidelink discovery announcements on a serving frequency or on one or more frequencies included in discInterFreqList, if included in SystemInformationBlockType19 of the PCell:

3> if the UE did not transmit a SidelinkUEInformation message since last entering RRC_CONNECTED state; or 3> if since the last time the UE transmitted a SidelinkUE-Information message the UE connected to a PCell not broadcasting SystemInformationBlockType19; or 3> if the last transmission of the SidelinkUEInformation message did not include discRxInterest:

4> initiate transmission of the SidelinkUEInformation message to indicate it is interested in sidelink discovery reception;

2> else:

3> if the last transmission of the SidelinkUEInformation message included discRxInterest:

4> initiate transmission of the SidelinkUEInformation message to indicate it is no longer interested in sidelink discovery reception;

2> if the UE is configured by upper layers to transmit non-public safety (PS) related sidelink discovery announcements on the primary frequency or on one or more frequencies included in discInterFreqList, if included in SystemInformationBlockType19 of the PCell, with discTxResourcesInterFreq included within discResourcesNonPS and not set to noTxOnCarrier:

3> if the UE did not transmit a SidelinkUEInformation message since last entering RRC_CONNECTED state; or 3> if since the last time the UE transmitted a SidelinkUE-Information message the UE connected to a PCell not broadcasting SystemInformationBlockType19 or connected to a PCell broadcasting SystemInformation-BlockType19 not including discTxResourcesInterFreq within discResourcesNonPS or discTxResourcesInter-Freq did not include all frequencies for which the UE will request resources; or 3> if the last transmission of the SidelinkUEInformation message did not include discTxResourceReq; or if the non-PS related sidelink discovery announcement resources required by the UE have changed (i.e. resulting in a change of discTxResourceReq) since the last transmission of the SidelinkUEInformation message:

4> initiate transmission of the SidelinkUEInformation message to indicate the non-PS related sidelink discovery announcement resources required by the UE;

2> else:

3> if the last transmission of the SidelinkUEInformation message included discTxResourceReq:

4> initiate transmission of the SidelinkUEInformation message to indicate it no longer requires non-PS related sidelink discovery announcement resources;

2> if configured by upper layers to transmit PS related sidelink discovery announcements on the primary frequency or, in case of non-relay PS related sidelink discovery announcements, on a frequency included in discInterFreqList, if included in SystemInformation-BlockType19, with discTxResourcesInterFreq included within discResourcesPS and not set to noTxOnCarrier:

3> if the UE did not transmit a SidelinkUEInformation message since last entering RRC_CONNECTED state; or 3> if since the last time the UE transmitted a SidelinkUE-Information message the UE connected to a PCell not broadcasting SystemInformationBlockType19, connected to a PCell broadcasting SystemInformation-BlockType19 not including discConfigPS, or in case of non-relay PS related transmission: (connected to a PCell broadcasting SystemInformationBlockType19 not including discTxResourcesInterFreq within discResourcesPS or for which discTxResourcesInterFreq did not include all frequencies for which the UE will request resources), or in case of relay related PS sidelink discovery announcements: (connected to a PCell broadcasting SystemInformationBlockType19 not including discConfigRelay) sidelink; or 3> if the last transmission of the SidelinkUEInformation message did not include discTxResourceReqPS; or if the PS related sidelink discovery announcement resources required by the UE have changed (i.e. resulting in a change of discTxResourceReqPS) since the last transmission of the SidelinkUEInformation message:

4> if configured by upper layers to transmit non-relay PS related sidelink discovery announcements; or 4> if the UE is acting as sidelink relay UE; and if SystemInformationBlockType19 includes discConfigRelay; and if the sidelink relay UE threshold conditions are met; or 4> if the UE is selecting a sidelink relay UE/has a selected sidelink relay UE; and if SystemInformationBlockType19 includes discConfigRelay; and if the sidelink remote UE threshold conditions are met:

5> initiate transmission of the SidelinkUEInformation message to indicate the PS related sidelink discovery announcement resources required by the UE;

2> else:

3> if the last transmission of the SidelinkUEInformation message included discTxResourceReqPS:

4> initiate transmission of the SidelinkUEInformation message to indicate it no longer requires PS related sidelink discovery announcement resources;

2> if configured by upper layers to monitor or transmit sidelink discovery announcements; and if the UE requires sidelink discovery gaps, to perform such actions:

3> if the UE did not transmit a SidelinkUEInformation message since last entering RRC_CONNECTED state; or 3> if since the last time the UE transmitted a SidelinkUEInformation message the UE connected to a PCell not broadcasting SystemInformationBlockType19 or connected to a PCell broadcasting SystemInformationBlockType19 not including gapRequestsAllowedCommon while at the same time the UE was not configured with gapRequestsAllowedDedicated; or 3> if the last transmission of the SidelinkUEInformation message did not include the gaps required to monitor or transmit the sidelink discovery announcements (i.e. UE requiring gaps to monitor discovery announcements while discRxGapReq was not included or UE requiring gaps to transmit discovery announcements while discTxGapReq was not included); or if the sidelink discovery gaps required by the UE have changed (i.e. resulting in a change of discRxGapReq or discTxGapReq) since the last transmission of the SidelinkUEInformation message:

4> if the UE is configured with gapRequestsAllowedDedicated set to true; or

4> if the UE is not configured with gapRequestsAllowedDedicated and gapRequestsAllowedCommon is included in SystemInformationBlockType19:

5> initiate transmission of the SidelinkUEInformation message to indicate the sidelink discovery gaps required by the UE;

2> else:

3> if the last transmission of the SidelinkUEInformation message included discTxGapReq or discRxGapReq:

4> initiate transmission of the SidelinkUEInformation message to indicate it no longer requires sidelink discovery gaps;

2> if the UE acquired the relevant parameters from the system information of one or more cells on a carrier included in the discSysInfoToReportConfig and T370 is running:

3> if the UE has configured lower layers to transmit or monitor the sidelink discovery announcements on those cells:

4> initiate transmission of the SidelinkUEInformation message to report the acquired system information parameters and stop T370;

1> if SystemInformationBlockType21 including sl-V2X-ConfigCommon is broadcast by the PCell:

2> ensure having a valid version of SystemInformationBlockType21 and SystemInformationBlockType26, if broadcast, for the PCell;

2> if configured by upper layers to receive V2X sidelink communication on a primary frequency or on one or more frequencies included in v2x-InterFreqInfoList, if included in SystemInformationBlockType21 or SystemInformationBlockType26 of the PCell:

3> if the UE did not transmit a SidelinkUEInformation message since last entering RRC_CONNECTED state; or 3> if since the last time the UE transmitted a SidelinkUEInformation message the UE connected to a PCell not broadcasting SystemInformationBlockType21 including sl-V2X-ConfigCommon; or 3> if the last transmission of the SidelinkUEInformation message did not include v2x-CommRxInterestedFreqList; or if the frequency(ies) configured by upper layers to receive V2X sidelink communication on has changed since the last transmission of the SidelinkUEInformation message:

4> initiate transmission of the SidelinkUEInformation message to indicate the V2X sidelink communication reception frequency(ies) of interest;

2> else:

3> if the last transmission of the SidelinkUEInformation message included v2x-CommRxInterestedFreqList:

4> initiate transmission of the SidelinkUEInformation message to indicate it is no longer interested in V2X sidelink communication reception;

2> if configured by upper layers to transmit V2X sidelink communication on a primary frequency or on one or more frequencies included in v2x-InterFreqInfoList, if included in SystemInformationBlockType21 or SystemInformationBlockType26 of the PCell:

3> if the UE did not transmit a SidelinkUEInformation message since last entering RRC_CONNECTED state; or 3> if since the last time the UE transmitted a SidelinkUEInformation message the UE connected to a PCell not broadcasting SystemInformationBlockType21 including sl-V2X-ConfigCommon; or 3> if the last transmission of the SidelinkUEInformation message did not include v2x-CommTxResourceReq; or if the information carried by the v2x-CommTxResourceReq has changed since the last transmission of the SidelinkUEInformation message:

4> initiate transmission of the SidelinkUEInformation message to indicate the V2X sidelink communication transmission resources required by the UE;

2> else:

3> if the last transmission of the SidelinkUEInformation message included v2x-CommTxResourceReq:

4> initiate transmission of the SidelinkUEInformation message to indicate it no longer requires V2X sidelink communication transmission resources;

The UE shall set the contents of the SidelinkUEInformation message as follows:

1> if the UE initiates the procedure to indicate it is (no more) interested to receive sidelink communication or discovery or receive V2X sidelink communication or to request (configuration/release) of sidelink communication or V2X sidelink communication or sidelink discovery transmission resources (i.e. UE includes all concerned information, irrespective of what triggered the procedure):

2> if SystemInformationBlockType18 is broadcast by the PCell:

3> if configured by upper layers to receive sidelink communication:

4> include commRxInterestedFreq and set it to the sidelink communication frequency;

3> if configured by upper layers to transmit non-relay related one-to-many sidelink communication:

4> include commTxResourceReq and set its fields as follows:

5> set carrierFreq to indicate the sidelink communication frequency i.e. the same value as indicated in commRxInterestedFreq if included;

5> set destinationInfoList to include the non-relay related one-to-many sidelink communication transmission destination(s) for which it requests E-UTRAN to assign dedicated resources;

3> if configured by upper layers to transmit non-relay related one-to-one sidelink communication; and 3> if commTxResourceUC-ReqAllowed is included in SystemInformationBlockType18:

4> include commTxResourceReqUC and set its fields as follows:

5> set carrierFreq to indicate the one-to-one sidelink communication frequency i.e. the same value as indicated in commRxInterestedFreq if included;

5> set destinationInfoList to include the non-relay related one-to-one sidelink communication transmission destination(s) for which it requests E-UTRAN to assign dedicated resources;

3> if configured by upper layers to transmit relay related one-to-one sidelink communication; and 3> if SystemInformationBlockType19 is broadcast by the PCell including discConfigRelay; and 3> if the UE is acting as sidelink relay UE; or if the UE has a selected sidelink relay UE; and if the sidelink remote UE threshold conditions are met:

4> include commTxResourceReqRelayUC and set its fields as follows:

5> set destinationInfoList to include the one-to-one sidelink communication transmission destination(s) for which it requests E-UTRAN to assign dedicated resources;

4> include ue-Type and set it to relayUE if the UE is acting as sidelink relay UE and to remoteUE otherwise;

3> if configured by upper layers to transmit relay related one-to-many sidelink communication; and 3> if SystemInformationBlockType19 is broadcast by the PCell including discConfigRelay; and 3> if the UE is acting as sidelink relay UE:

4> include commTxResourceReqRelay and set its fields as follows:

5> set destinationInfoList to include the one-to-many sidelink communication transmission destination(s) for which it requests E-UTRAN to assign dedicated resources;

4> include ue-Type and set it to relayUE;

2> if SystemInformationBlockType19 is broadcast by the PCell:

3> if configured by upper layers to receive sidelink discovery announcements on a serving frequency or one or more frequencies included in discInterFreqList, if included in SystemInformationBlockType19:

4> include discRxInterest;

3> if the UE is configured by upper layers to transmit non-PS related sidelink discovery announcements:

4> for each frequency on which the UE is configured to transmit non-PS related sidelink discovery announcements that concerns the primary frequency or that is included in discInterFreqList with discTxResourcesInterFreq included within discResourcesNonPS and not set to noTxOnCarrier:

5> for the first frequency, include discTxResourceReq and set it to indicate the number of discovery messages for sidelink discovery announcement(s) for which it requests E-UTRAN to assign dedicated resources as well as the concerned frequency, if different from the primary;

5> for any additional frequency, include discTxResourceReqAddFreq and set it to indicate the number of discovery messages for sidelink discovery announcement(s) for which it requests E-UTRAN to assign dedicated resources as well as the concerned frequency;

3> if configured by upper layers to transmit PS related sidelink discovery announcements; and 3> if the frequency on which the UE is configured to transmit PS related sidelink discovery announcements either concerns the primary frequency or, in case of non-relay PS related sidelink discovery announcements, is included in discInterFreqList with discTxResources InterFreq included within discResourcesPS and not set to noTxOnCarrier:

4> if configured by upper layers to transmit non-relay PS related sidelink discovery announcements and SystemInformationBlockType19 includes discConfigPS; or 4> if the UE is acting as sidelink relay UE; and if SystemInformationBlockType19 includes discConfigRelay; and if the sidelink relay UE threshold conditions are met; or 4> if the UE is selecting a sidelink relay UE/has a selected sidelink relay UE; and if SystemInformationBlockType19 includes discConfigRelay; and if the sidelink remote UE threshold conditions are met:

5> include discTxResourceReqPS and set it to indicate the number of discovery messages for PS related sidelink discovery announcement(s) for which it requests E-UTRAN to assign dedicated resources as well as the concerned frequency, if different from the primary; 2> if SystemInformationBlockType21 is broadcast by the PCell and SystemInformationBlockType21 includes sl-V2X-ConfigCommon:

3> if configured by upper layers to receive V2X sidelink communication:

4> include v2x-CommRxInterestedFreqList and set it to the frequency(ies) for V2X sidelink communication reception;

3> if configured by upper layers to transmit V2X sidelink communication:

4> if configured by upper layers to transmit pedestrian-to-everything (P2X) related V2X sidelink communication:

5> include p2x-CommTxType set to true;

4> include v2x-CommTxResourceReq and set its fields as follows for each frequency on which the UE is configured for V2X sidelink communication transmission:

5> set carrierFreqCommTx to indicate the frequency for V2X sidelink communication transmission;

5> set v2x-TypeTxSync to the current synchronization reference type used on the associated carrierFreqCommTx for V2X sidelink communication transmission;

5> set v2x-DestinationInfoList to include the V2X sidelink communication transmission destination(s) for which it requests E-UTRAN to assign dedicated resources;

1> else if the UE initiates the procedure to request sidelink discovery transmission and/or reception gaps:

2> if the UE is configured with gapRequestsAllowedDedicated set to true; or

2> if the UE is not configured with gapRequestsAllowedDedicated and gapRequestsAllowedCommon is included in SystemInformationBlockType19:

3> if the UE requires sidelink discovery gaps to monitor the sidelink discovery announcements the UE is configured to monitor by upper layers:

4> include discRxGapReq and set it to indicate, for each frequency that either concerns the primary frequency or is included in discInterFreqList on which the UE is configured to monitor sidelink discovery announcements and for which it requires sidelink discovery gaps to do so, the gap pattern(s) as well as the concerned frequency, if different from the primary;

3> if the UE requires sidelink discovery gaps to transmit the sidelink discovery announcements the UE is configured to transmit by upper layers:

4> include discTxGapReq and set it to indicate, for each frequency that either concerns the primary or is included in discInterFreqList on which the UE is configured to transmit sidelink discovery announcements and for which it requires sidelink discovery gaps to do so, the gap pattern(s) as well as the concerned frequency, if different from the primary;

1> else if the UE initiates the procedure to report the system information parameters related to sidelink discovery of carriers other than the primary:

2> include discSysInfoReportFreqList and set it to report the system information parameter acquired from the cells on those carriers;

The UE shall submit the SidelinkUEInformation message to lower layers for transmission.

Sidelink resource allocation in 5G NR is described. Section 5.3 of 3GPP TS 38.885 V16.0.0 can be referred.

At least the following two SL resource allocation modes may be defined.

Mode 1: BS schedules SL resource(s) to be used by UE for SL transmission(s).

Mode 2: UE determines, i.e. BS does not schedule, SL transmission resource(s) within SL resources configured by BS/network or pre-configured SL resources.

The definition of SL resource allocation Mode 2 covers:

a) UE autonomously selects SL resource for transmission b) UE assists SL resource selection for other UE(s), a functionality which can be part of a), c), d)

c) UE is configured with NR configured grant (Type-1 like) for SL transmission d) UE schedules SL transmissions of other UEs Resource allocation mode 2 supports reservation of SL resources at least for blind retransmission.

Sensing- and resource (re-)selection-related procedures are supported for resource allocation mode 2.

The sensing procedure considered is defined as decoding sidelink control information (SCI(s)) from other UEs and/or SL measurements. Decoding SCI(s) in this procedure provides at least information on SL resources indicated by the UE transmitting the SCI. The sensing procedure uses a L1 SL reference signal received power (RSRP) measurement based on SL demodulation reference signal (DMRS) when the corresponding SCI is decoded.

The resource (re-)selection procedure considered uses the results of the sensing procedure to determine resource(s) for SL transmission.

For mode 2(a), SL sensing and resource selection procedures may be considered in the context of a semi-persistent scheme where resource(s) are selected for multiple transmissions of different transport blocks (TBs) and a dynamic scheme where resource(s) are selected for each TB transmission.

The following techniques are studied to identify occupied SL resources:

Decoding of SL control channel transmissions

SL measurements

Detection of SL transmissions

The following aspects are studied for SL resource selection

How a UE selects resource for physical sidelink control channel (PSCCH) and physical sidelink shared channel (PSSCH) transmission (and other SL physical channel/signals that are defined)

Which information is used by UE for resource selection procedure

For out-of-coverage operation, mode 2(c) assumes a (pre-)configuration of single or multiple SL transmission patterns, defined on each SL resource pool. For in-coverage operation, mode 2(c) assumes that gNB configuration indicates single or multiple SL transmission patterns, defined on each SL resource pool. If there is a single pattern configured to a transmitting UE, there is no sensing procedure executed by UE, while if multiple patterns are configured, there is a possibility of a sensing procedure.

A pattern is defined by the size and position(s) of the resource in time and frequency, and the number of resources.

For mode 2(d), in the context of group-based SL communication, it supported for UE-A to inform its serving gNB about members UE-B, UE-C, and so on of a group, and for the gNB to provide individual resource pool configurations and/or individual resource configurations to each group member through UE-A. UE-A cannot modify the configurations, and there is no direct connection required between any member UE and the gNB. Higher-layer only signaling is used to provide the configurations. Such functionality is up to UE capability(ies).

Sidelink resource allocation is described in detail. If the TX UE is in RRC_CONNECTED and configured for gNB scheduled sidelink resource allocation (e.g., mode 1), the TX UE may transmit sidelink UE information including traffic pattern of Service, TX carriers and/or RX carriers mapped to service, QoS information related to service (e.g. 5QI, ProSe-per-packet priority (PPPP), ProSe-per-packet reliability (PPPR), QoS class identifier (QCI) value), and destination related to service.

After receiving the sidelink UE information, the gNB constructs sidelink configuration at least including one or more resource pools for service and sidelink buffer status reporting (BSR) configuration. The gNB signals the sidelink configuration to the TX UE and then the TX UE configures lower layers with sidelink configuration.

If a message becomes available in L2 buffer for sidelink transmission, the TX UE triggers scheduling request (SR), so that the TX UE transmits PUCCH resource. If PUCCH resource is not configured, the TX UE performs random access procedure as the SR. If an uplink grant is given at a result of the SR, the TX UE transmits sidelink BSR to the gNB. The sidelink BSR indicates at least a destination index, a logical channel group (LCG), and a buffer size corresponding to the destination.

After receiving the sidelink BSR, the gNB transmits a sidelink grant to the TX UE, e.g., by sending downlink control information (DCI) in PDCCH. The DCI may include an allocated sidelink resource. If the TX UE receives the DCI, the TX UE uses the sidelink grant for transmission to the RX UE.

Alternatively, if the TX UE is configured for UE autonomous scheduling of sidelink resource allocation (e.g., mode 2) regardless of RRC state, the TX UE autonomously select or reselect sidelink resources to create a sidelink grant used for transmission to the RX UE.

When the UE enters RRC_CONNECTED, dedicated sidelink configuration can be provided to the UE. Such dedicated configuration will be provided only after UE reports sidelink UE information to the network. The UE may need to perform sidelink transmissions even before reporting of sidelink UE information. However, the UE cannot perform sidelink transmissions because the UE does not know how to apply sidelink configuration for sidelink transmissions occurring before reporting of sidelink UE information.

In addition, the UE may leave RRC_CONNECTED due to either reception of RRC release message and/or Uu link failure. If the UE has been performing sidelink transmissions based on dedicated sidelink configuration before leaving RRC_CONNECTED, the UE may need to continue performing sidelink transmissions even after leaving RRC_CONNECTED. After cell selection, the UE may wait for some time until the UE receives system information including new sidelink configuration from the new cell. Thus, the UE cannot perform sidelink transmissions because the UE does not know how to apply sidelink configuration for sidelink transmissions immediately after leaving RRC_CONNECTED.

The following drawings are created to explain specific embodiments of the present disclosure. The names of the specific devices or the names of the specific signals/messages/fields shown in the drawings are provided by way of example, and thus the technical features of the present disclosure are not limited to the specific names used in the following drawings.

Figure 10:
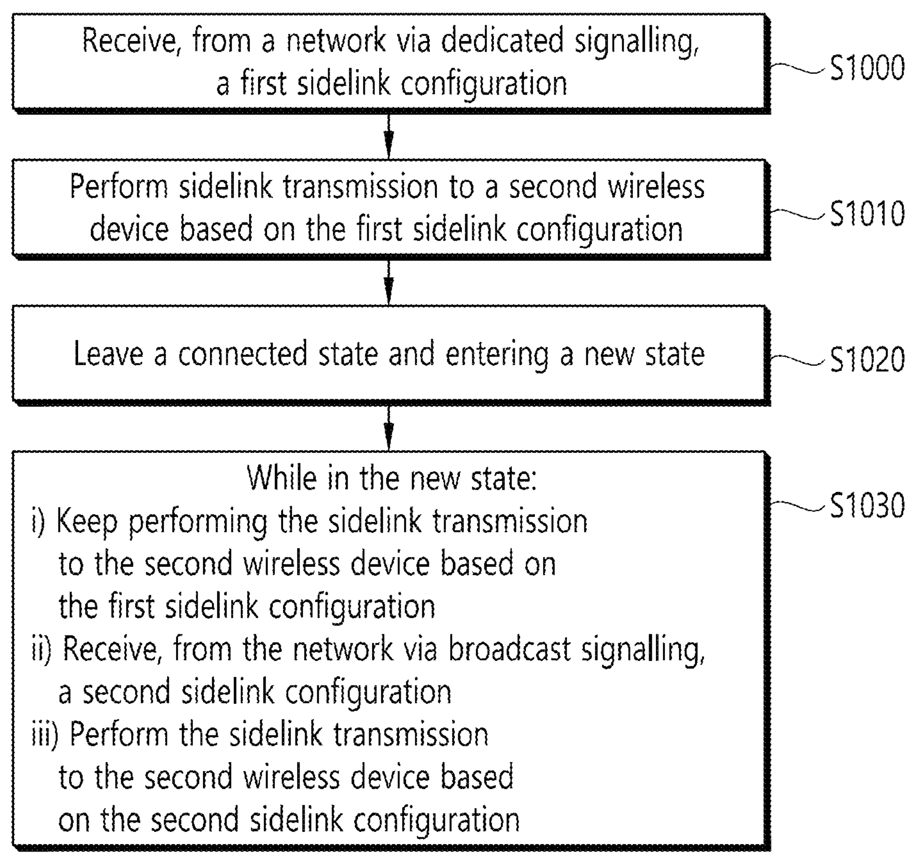
FIG. 10 shows an example of a method performed by a first wireless device (e.g., transmitting (TX) wireless device) configured to operate in a wireless communication system to which implementations of the present disclosure is applied.

FIG. 10 shows an example of a method performed by a first wireless device (e.g., transmitting (TX) wireless device) configured to operate in a wireless communication system to which implementations of the present disclosure is applied.

In step S1000, the first wireless device receives, from a network via dedicated signaling, a first sidelink configuration.

In step S1010, the first wireless device performs sidelink transmission to a second wireless device based on the first sidelink configuration.

In step S1020, the first wireless device leaves a connected state and entering a new state.

In some implementations, the connected state may be RRC connected state (e.g., RRC_CONNECTED), and the new state may be one of RRC idle state (e.g., RRC_IDLE) and/or RRC inactive state (e.g., RRC_INACTIVE).

In some implementations, the leaving the connected state may comprise detecting a certain condition. The certain condition may include at least one of a radio link failure, a beam failure, an initiation of RRC re-establishment, an RRC re-establishment failure, a cell selection, a cell reselection, a handover failure, a reception of handover command, and/or a random access procedure failure.

In step S1030, while in the new state, the first wireless device i) keeps performing the sidelink transmission to the second wireless device based on the first sidelink configuration, ii) receiving, from the network via broadcast signaling, a second sidelink configuration, and iii) performing the sidelink transmission to the second wireless device based on the second sidelink configuration.

In some implementations, a timer may starts upon leaving the connected state and entering the new state. Performing of the sidelink transmission to the second wireless device based on the first sidelink configuration may be kept while the timer is running. The timer may stop upon receiving the second sidelink configuration. A value for the timer may be received via the first sidelink configuration. The timer may be configured per service and/or per destination.

In some implementations, the first wireless device may be in communication with at least one of a mobile device, a network, and/or autonomous vehicles other than the first wireless device.

Furthermore, the method in perspective of the first wireless device described above in FIG. 10 may be performed by first wireless device 100 shown in FIG. 2, the wireless device 100 shown in FIG. 3, the first wireless device 100 shown in FIG. 4 and/or the UE 100 shown in FIG. 5.

More specifically, the first wireless device comprises at least one transceiver, at least processor, and at least one computer memory operably connectable to the at least one processor and storing instructions that, based on being executed by the at least one processor, perform operations.

The operations comprise receiving, from a network via dedicated signaling, a first sidelink configuration, performing sidelink transmission to a second wireless device based on the first sidelink configuration, leaving a connected state and entering a new state.

In some implementations, the connected state may be RRC connected state (e.g., RRC_CONNECTED), and the new state may be one of RRC idle state (e.g., RRC_IDLE) and/or RRC inactive state (e.g., RRC_INACTIVE).

In some implementations, the leaving the connected state may comprise detecting a certain condition. The certain condition may include at least one of a radio link failure, a beam failure, an initiation of RRC re-establishment, an RRC re-establishment failure, a cell selection, a cell reselection, a handover failure, a reception of handover command, and/or a random access procedure failure.

The operations comprise, while in the new state: i) keeping performing the sidelink transmission to the second wireless device based on the first sidelink configuration, ii) receiving, from the network via broadcast signaling, a second sidelink configuration, and iii) performing the sidelink transmission to the second wireless device based on the second sidelink configuration.

In some implementations, a timer may starts upon leaving the connected state and entering the new state. Performing of the sidelink transmission to the second wireless device based on the first sidelink configuration may be kept while the timer is running. The timer may stop upon receiving the second sidelink configuration. A value for the timer may be received via the first sidelink configuration. The timer may be configured per service and/or per destination.

Furthermore, the method in perspective of the first wireless device described above in FIG. 10 may be performed by control of the processor 102 included in the first wireless device 100 shown in FIG. 2, by control of the communication unit 110 and/or the control unit 120 included in the wireless device 100 shown in FIG. 3, by control of the processor 102 included in the first wireless device 100 shown in FIG. 4 and/or by control of the processor 102 included in the UE 100 shown in FIG. 5.

More specifically, an apparatus for configured to operate in a wireless communication system (e.g., first wireless device) comprises at least processor, and at least one computer memory operably connectable to the at least one processor. The at least one processor is configured to perform operations comprising obtaining, via dedicated signaling, a first sidelink configuration, generating sidelink transmission based on the first sidelink configuration, leaving a connected state and entering a new state, while in the new state: i) keeping generating the sidelink transmission based on the first sidelink configuration, ii) obtaining, via broadcast signaling, a second sidelink configuration, and iii) generating the sidelink transmission based on the second sidelink configuration.

Furthermore, the method in perspective of the first wireless device described above in FIG. 10 may be performed by a software code 105 stored in the memory 104 included in the first wireless device 100 shown in FIG. 4.

More specifically, at least one computer readable medium (CRM) stores instructions that, based on being executed by at least one processor, perform operations comprising obtaining, via dedicated signaling, a first sidelink configuration, generating sidelink transmission based on the first sidelink configuration, leaving a connected state and entering a new state, while in the new state: i) keeping generating the sidelink transmission based on the first sidelink configuration, ii) obtaining, via broadcast signaling, a second sidelink configuration, and iii) generating the sidelink transmission based on the second sidelink configuration.

Figure 11:
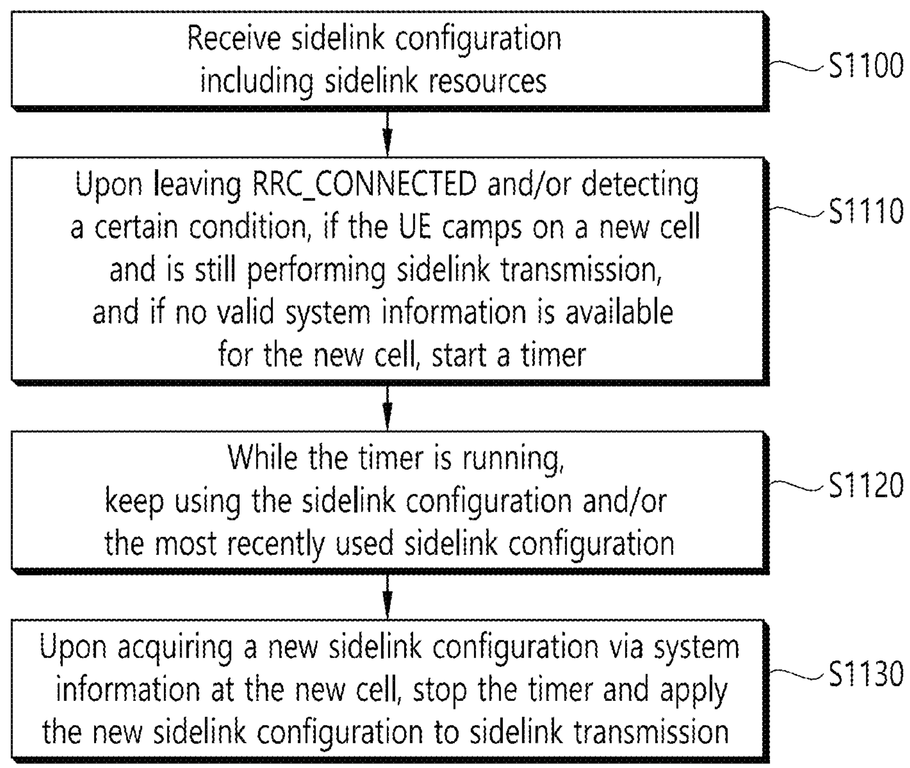
FIG. 11 shows an example of a method for performing sidelink communication by a UE to which implementations of the present disclosure is applied.

FIG. 11 shows an example of a method for performing sidelink communication by a UE to which implementations of the present disclosure is applied.

In step S1100, the UE receives sidelink configuration including sidelink resources for sidelink transmission via dedicated signaling, i.e., UE dedicated sidelink configuration.

In some implementations, the sidelink configuration may include information on a validity time for a service and/or a destination.

In step S1110, upon leaving RRC_CONNECTED and/or detecting a certain condition, if the UE camps on a new cell and is still performing sidelink transmission for the service and/or the destination, and if no valid system information is available for the new cell, the UE starts a timer.

In some implementations, the certain condition may include one of radio link failure, beam failure, initiation of RRC re-establishment, RRC re-establishment failure, cell selection, cell reselection, handover failure, reception of handover command, and/or random access procedure failure.

In step S1120, while the timer is running, the UE keeps using the UE dedicated sidelink configuration and/or the most recently used sidelink configuration.

Alternatively, upon leaving RRC_CONNECTED and/or detecting a certain condition, the UE may apply pre-configuration and/or default configuration to the sidelink transmissions for the service or the destination.

In step S1130, upon acquiring a new sidelink configuration via system information at the new cell, the UE stops the timer and applies the new sidelink configuration to sidelink transmissions for the service and/or the destination.

Figure 12:
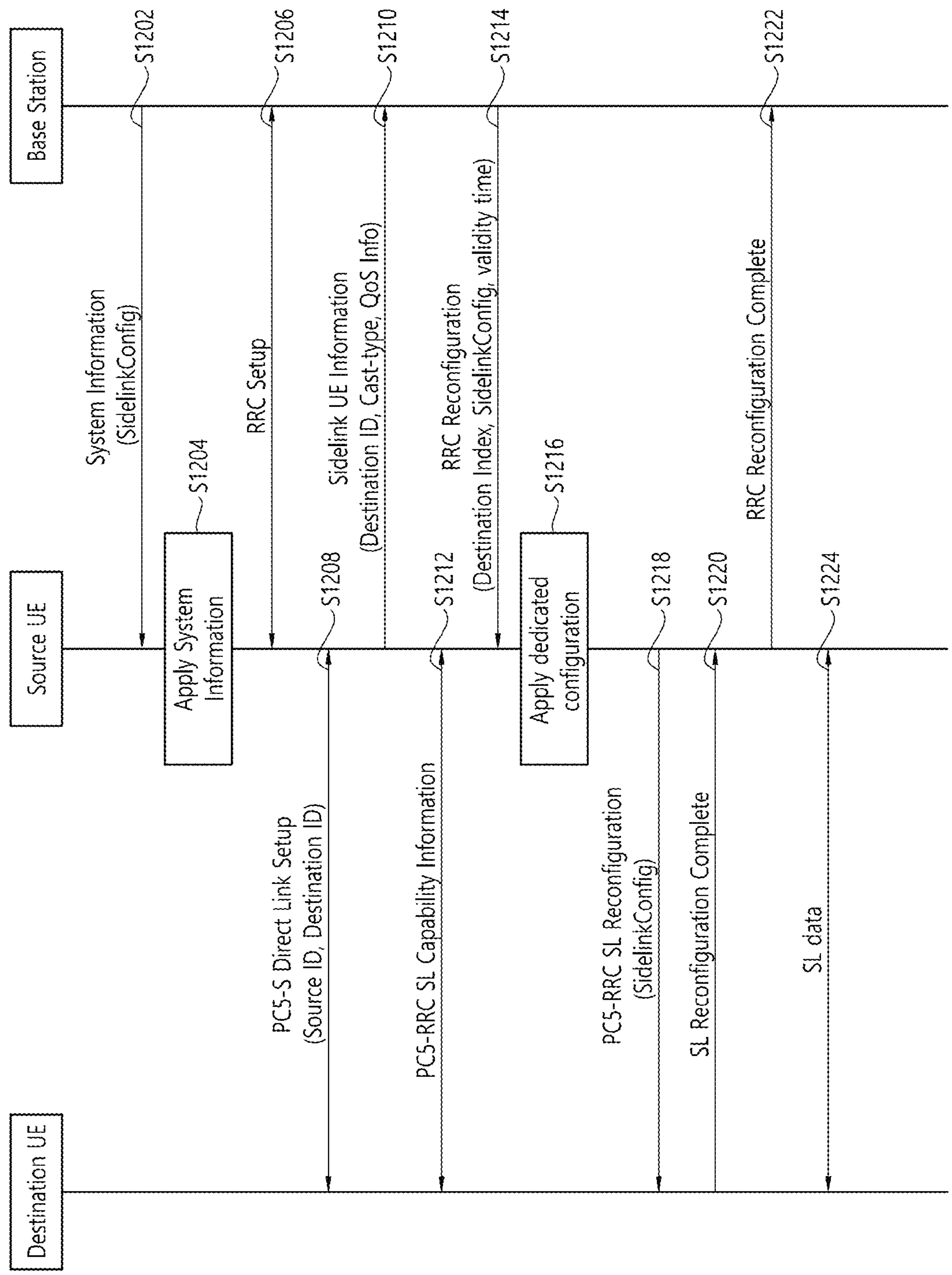
FIG. 12 and FIG. 13 shows an example of sidelink configuration for sidelink transmission and reception to which implementations of the present disclosure is applied.
Figure 13:
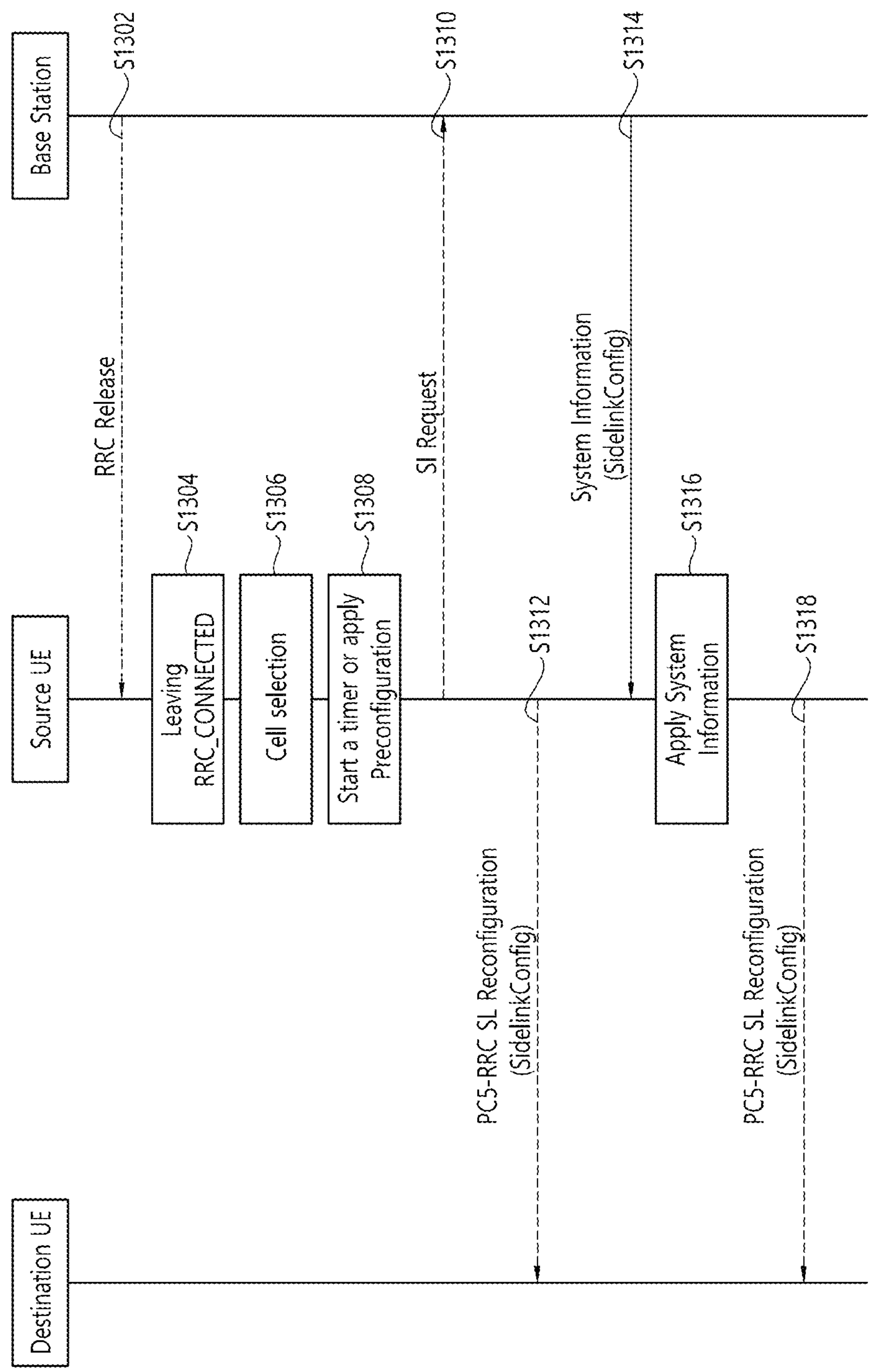

FIG. 12 and FIG. 13 shows an example of sidelink configuration for sidelink transmission and reception to which implementations of the present disclosure is applied.

First, FIG. 12 is described.

In step S1202, when a source UE is in RRC_IDLE and/or RRC_INACTIVE, the source UE receives system information including sidelink configuration (e.g., SidelinkConfig).

In step S1204, the source UE applies the sidelink configuration to perform sidelink transmission and reception.

In step S1206, the source UE establishes a RRC connection with the network. Upon entering RRC_CONNECTED, if the source UE has been performing sidelink transmission, the source UE keeps performing sidelink transmission on SL-SCH by using the sidelink configuration received via system information in step S1202 and/or pre-configuration stored in the source UE, until a UE dedicated sidelink configuration is received from the network. Alternatively, the source UE may keep performing sidelink transmission on SL-SCH by using the sidelink configuration with default values and/or default configuration, until a UE dedicated sidelink configuration is received from the network.

In step S1208, the source UE discovers a destination UE and sends a PC5-S direct link request message on SL-SCH to the destination UE in order to establish a PC5-S direct link with the destination UE for a service. SL-SCH transmission may be based on the sidelink configuration received in step S1202. In response to the request, the destination UE sends a PC5-S direct link response message on SL-SCH to the source UE.

In step S1210, the source UE sends sidelink UE information to the network. The sidelink UE information can include at least one of the destination ID corresponding to the destination UE, a frequency mapped to the service, the cast-type of the service indicating one of unicast, groupcast and/or broadcast, and/or QoS information of the service.

In step S1212, the destination UE may send a sidelink UE capability information of the destination UE over SL-SCH to the source UE with the PC5-S direct link response message. Upon receiving the sidelink UE capability information of the destination UE, the source UE may send a sidelink UE capability of the source UE over SL-SCH to the destination UE.

In step S1214, upon receiving the sidelink UE information from the source UE, the network constructs sidelink configuration for the service and sends a RRC reconfiguration message including the UE dedicated sidelink configuration (e.g., SidelinkConfig) to the source UE. The message may also include information on validity time which is applied to the UE dedicated sidelink configuration.

In step S1216, upon receiving the RRC reconfiguration message including the UE dedicated sidelink configuration, the source UE reconfigures sidelink configuration based on the UE dedicated sidelink configuration. In other words, the source UE applies the UE dedicated sidelink configuration.

In step S1218, the source UE constructs a PC5-RRC sidelink configuration based on the UE dedicated sidelink configuration received in step S1214. The source UE sends a PC5-RRC message including the PC5-RRC sidelink configuration to the destination UE. Upon receiving the PC5-

RRC message including the PC5-RRC sidelink configuration, the destination UE applies the PC5-RRC sidelink configuration for sidelink transmission and reception towards the source UE.

In step S1220, the destination UE transmits SL reconfiguration complete message to the source UE.

In step S1222, the source UE transmits RRC reconfiguration complete message to the network.

In step S1224, the source UE and the destination UE perform sidelink transmissions and receptions of sidelink data.

FIG. 13 of which operations follow the operations shown in FIG. 12 is now described.

In step S1302, the source UE may receive RRC Release message which commands the source UE to leave RRC_CONNECTED.

In step S1304, the source UE leaves RRC_CONNECTED.

In step S1306, the source UE performs cell selection.

In step S1308, if the validity time has been configured in the UE dedicated sidelink configuration received in step S1214, the source UE starts a timer upon leaving RRC_CONNECTED, upon receiving a RRC Release message, upon initiation of RRC re-establishment procedure, upon RRC re-establishment failure, upon detection of radio link failure, upon detection of beam failure, and/or upon cell selection. For example, upon receiving a RRC release message in step S1302 and/or upon RRC re-establishment failure, the source UE may leave RRC_CONNECTED. When the source UE leaves RRC_CONNECTED and the source UE is still performing sidelink transmission and/or reception for the service or the destination, the source UE may start a timer.

In some implementations, while the timer is running for the service and/or the destination, the source UE may apply the dedicated sidelink configuration for the sidelink transmissions and receptions for the service or the destination. The validity time can be configured per service or destination. That is, while the timer is running, the source UE may keep performing sidelink transmission and/or reception based on the dedicated sidelink configuration until the source UE acquires system information from a serving cell after leaving RRC_CONNECTED.

Alternatively, upon leaving RRC_CONNECTED, upon receiving a RRC release message, upon initiation of RRC re-establishment procedure, upon RRC re-establishment failure, upon detection of radio link failure, upon detection of beam failure, and/or upon cell selection, the source UE may apply the pre-configuration and/or default configuration for the sidelink transmissions and receptions for the service or the destination.

In step S1310, the source UE may transmit SI request to the network.

In step S1312, upon applying the pre-configuration and/or default configuration for the sidelink transmissions and receptions, the source UE may reconstruct a PC5-RRC sidelink configuration based on the pre-configuration and/or default configuration and then send the PC5-RRC message including the PC5-RRC sidelink configuration. Then, the source UE may perform sidelink transmission and/or reception of sidelink data based on the pre-configuration and/or default configuration for the service or the destination, until the source UE acquires a new sidelink configuration via system information from a serving cell after leaving RRC_CONNECTED.

In step S1314, the source UE receives a new sidelink configuration via system information.

In step S1316, the source UE applies the new sidelink configuration acquired from system information to sidelink transmission and/or reception of sidelink data.

In step S1318, the source UE may reconstruct a PC5-RRC sidelink configuration based on the new sidelink configuration and then send the PC5-RRC message including the PC5-RRC sidelink configuration.

In some implementations, when the source UE moves to a new cell for which it has no valid system information and the source UE is still performing sidelink transmission and/or reception for the service or the destination, the source UE may start a timer. While the timer is running, the source UE may keep performing sidelink transmission and/or reception based on pre-configuration, default configuration, and/or the existing sidelink configuration that has been configured at the previous cell until the source UE acquires system information from the new cell.

Then, the source UE may reconstruct a PC5-RRC sidelink configuration based on the pre-configuration, default configuration and/or the existing configuration, and then send the PC5-RRC message including the PC5-RRC sidelink configuration. Then, the source UE may perform sidelink transmission and/or reception of sidelink data based on the pre-configuration, default configuration or the existing configuration for the service or the destination, until the source UE acquires a new sidelink configuration via system information from the new cell.

A method performed by a second wireless device (e.g., receiving (RX) wireless device) configured to operate in a wireless communication system includes receiving, from a first wireless device, sidelink transmission based on a first sidelink configuration, wherein the first wireless device enters a new state from a connected state, and wherein the first sidelink configuration is provided to the first wireless device via dedicated signaling while the first wireless device is in the connected state, and receiving, from the first wireless device, the sidelink transmission based on a second sidelink configuration after the first wireless device receives the second sidelink configuration after entering the new state.

Furthermore, the method in perspective of the second wireless device described above may be performed by second wireless device 200 shown in FIG. 2, the wireless device 100 shown in FIG. 3, the second wireless device 200 shown in FIG. 4 and/or the UE 100 shown in FIG. 5.

More specifically, the second wireless device comprises at least one transceiver, at least processor, and at least one computer memory operably connectable to the at least one processor and storing instructions that, based on being executed by the at least one processor, perform operations.

The operations comprise receiving, from a first wireless device, sidelink transmission based on a first sidelink configuration, wherein the first wireless device enters a new state from a connected state, and wherein the first sidelink configuration is provided to the first wireless device via dedicated signaling while the first wireless device is in the connected state, and receiving, from the first wireless device, the sidelink transmission based on a second sidelink configuration after the first wireless device receives the second sidelink configuration after entering the new state.

Furthermore, the method in perspective of the second wireless device described above may be performed by control of the processor 202 included in the second wireless device 200 shown in FIG. 2, by control of the communication unit 110 and/or the control unit 120 included in the wireless device 100 shown in FIG. 3, by control of the processor 102 included in the second wireless device 200 shown in FIG. 4 and/or by control of the processor 102 included in the UE 100 shown in FIG. 5.

More specifically, an apparatus for configured to operate in a wireless communication system (e.g., second wireless device) comprises at least processor, and at least one computer memory operably connectable to the at least one processor. The at least one processor is configured to perform operations comprising obtaining sidelink transmission based on a first sidelink configuration, wherein a first wireless device enters a new state from a connected state, and wherein the first sidelink configuration is provided to the first wireless device via dedicated signaling while the first wireless device is in the connected state, and obtaining the sidelink transmission based on a second sidelink configuration after the first wireless device receives the second sidelink configuration after entering the new state.

Furthermore, the method in perspective of the second wireless device described above may be performed by a software code 205 stored in the memory 204 included in the second wireless device 200 shown in FIG. 4.

More specifically, at least one CRM stores instructions that, based on being executed by at least one processor, perform operations comprising obtaining sidelink transmission based on a first sidelink configuration, wherein a first wireless device enters a new state from a connected state, and wherein the first sidelink configuration is provided to the first wireless device via dedicated signaling while the first wireless device is in the connected state, and obtaining the sidelink transmission based on a second sidelink configuration after the first wireless device receives the second sidelink configuration after entering the new state.

In summary, according to implementations of the present disclosure described above, in RRC_CONNECTED, the UE applies the NR sidelink communications parameters provided in RRCReconfiguration (if any). In RRC_IDLE or RRC_INACTIVE, the UE applies the NR sidelink communications parameters provided in system information (if any). For other cases, UEs apply the NR sidelink communications parameters provided in SidelinkPreconfigNR (if any). When UE performs state transition between above three cases, the UE applies the NR sidelink communications parameters provided in the new state, after acquisition of the new configurations. Before acquisition of the new configurations, UE continues applying the NR sidelink communications parameters provided in the old state.

Initiation of PC5-RRC procedures for unicast link establishment according to implementations of the present disclosure is described.

Figure 14:
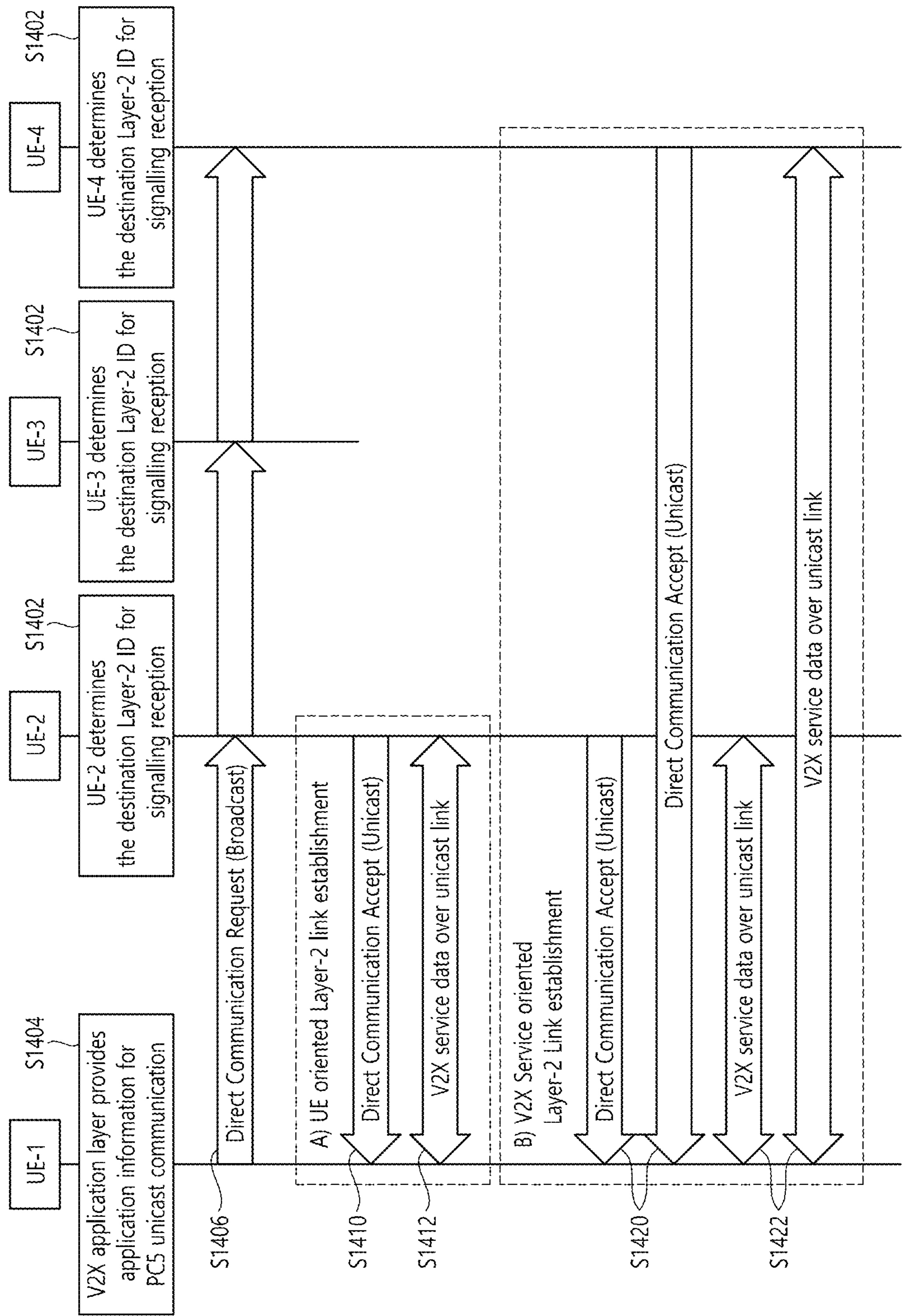
FIG. 14 shows an example of layer-2 link establishment procedure for unicast link to which implementations of the present disclosure is applied.

FIG. 14 shows an example of layer-2 link establishment procedure for unicast link to which implementations of the present disclosure is applied.

In step S1402, each UE (i.e., UE-2, UE-3 and UE-4) determine the destination layer-2 ID for signaling reception for PC5 unicast link establishment.

In step S1404, the V2X application layer in UE-1 provides application information for PC5 unicast communication.

In step S1406, (if the establishment of a new PC5 unicast link is triggered in step S1404), UE-1 sends a direct communication request message via PC5 broadcast using the source layer-2 ID and the destination layer-2 ID to initiate the unicast layer-2 link establishment procedure.

In steps S1410/S1420, the target UE, i.e., UE-2 or UE-4, responds with a direct communication accept message which is sent to UE-1. Upon receiving the direct communication accept message from peer UE, UE-1 obtains the peer UE's Layer-2 ID for future communication, for signaling and data traffic for this unicast link.

The V2X layer of the UE that established PC5 unicast link passes the PC5 link identifier assigned for the unicast link and PC5 unicast link related information down to the AS layer. The PC5 unicast link related information includes layer-2 ID information (i.e., source layer-2 ID and destination Layer-2 ID). This enables the AS layer to maintain the PC5 link identifier together with the PC5 unicast link related information.

In steps S1412/S1422, V2X service data is transmitted over the established unicast link. The PC5 link identifier and PC5 QoS flow identifier (PFI) are provided to the AS layer, together with the V2X service data. UE-1 sends the V2X service data using the source layer-2 ID (i.e., UE-1's layer-2 ID for this unicast link) and the destination layer-2 ID (i.e., the peer UE's Layer-2 ID for this unicast link).

Pc5 unicast link is bi-directional, therefore the peer UE of UE-1 can send the V2X service data to UE-1 over the unicast link with UE-1.

Meanwhile, UE may perform additional procedure for mutual authentication and security association establishment. UE think that it is likely that UE will complete mutual authentication and security association establishment after unicast mode PC5-1 Layer-2 link establishment procedure.

When the application layer in the UE initiates data transfer for a V2X service which requires unicast mode of communication over PC5 reference point, the UE shall reuse an existing PC5 unicast link if the pair of peer application layer IDs and the network layer protocol of this PC5 unicast link are identical to those required by the application layer in the UE for this V2X service, and modify the existing PC5 unicast link to add this V2X service. Otherwise the UE shall trigger the establishment of a new PC5 unicast link.

For Uu RRC establishment, upon request from the upper layer, RRC normally initiates RRC establishment procedure. It is the case even for PC5-RRC connection establishment, so that PC5-RRC should rely on upper layers for initiation of the first PC5-RRC procedure. When UE triggers the establishment of a new PC5 unicast link, PC5-S requests the first PC5-RRC procedure at least after PC5-S layer-2 link establishment procedure (and, if required, security establishment). Thus, from AS perspective, upon request from upper layers, PC5-RRC initiates the first PC5-RRC procedure for the unicast link in the UE side.

In addition, separate PC5-RRC procedures and messages are used to transfer at least UE capability and AS-layer configuration including SLRB configuration of the other UE. For bi-directional sidelink traffic, both peer UEs exchange their own UE capability and AS-layer configuration using separate bi-directional procedures in both sidelink directions.

It is likely that UE-1 provides AS-layer configuration to UE-2 or 4 based on sidelink UE capability. Thus, exchange of UE capability should be done before AS-layer configuration. In other words, the first PC5-RRC procedure triggered by request from upper layers is the sidelink UE capability information procedure.

In addition, if encryption of the UE capability is required, exchange of UE capability can be initiated immediately after security establishment. Thus, upon security establishment, e.g., upon reception of an upper layer message activating security, UE could immediately initiate transmission of sidelink UE capability information to a peer UE which may subsequently send its own sidelink UE capability information (assuming that encryption of the UE capability is required).

After exchange of sidelink UE capability, UE will initiate exchange of AS-layer configuration. For example, when UE-1 receives sidelink UE capability of the peer UE, UE-1 could immediately trigger and send the AS-layer configuration in sidelink to the peer UE. In other words, upon reception of sidelink UE capability from a peer UE, UE initiates transmission of AS-layer configuration.

PC5-RRC connection and state according to implementations of the present disclosure is described.

It has been agreed that PC5-RRC connection for the unicast link is supported. A PC5-RRC connection between two UEs is used to establish a sidelink UE AS context of each other. If a UE receives a PC5-RRC message from the other UE, the UE can store at least sidelink related UE capability information from the PC5-RRC message as a sidelink UE context of the other UE. Two UEs use the stored sidelink UE context for an upcoming service over the PC5-RRC connection.

It seems that explicit PC5-RRC connection establishment procedure seems not so necessary because the first PC5-RRC procedure can be used instead of the explicit PC5-RRC connection establishment procedure. However, it should be discussed when PC5-RRC will consider that the PC5-RRC connection is established because UE may need to perform additional UE behaviors after the PC5-RRC connection establishment.

There seem two options of defining the PC5-RRC connection establishment without an explicit procedure:

Option 1: When PC5-S Layer-2 link establishment procedure completes, PC5-RRC connection is established.

Option 2: When the first PC5-RRC procedure completes, PC5-RRC connection is established.

In Option 1, when upper layers completes establishment of the unicast link, upper layers inform PC5-RRC about establishment of the unicast link. Then, UE will consider that the PC5-RRC connection is established. However, since capability has been not exchanged yet, peer UEs would not have stored AS context for each other. In addition, UEs would still need to wait for unicast specific AS tasks such as SL radio link monitoring (RLM) and HARQ feedback.

In Option 2, when the first PC5-RRC procedure requested by upper layers completes, PC5-RRC connection is established. For example, when peer UEs exchange their own capability, both UEs will store UE capability information as AS context for each other. Then, both UEs will start unicast specific AS tasks such as SL RLM and HARQ feedback, e.g., upon reception of AS-layer configuration.

Option 2 may be preferred. Option 1 looks strange because if the first PC5-RRC procedure completes unsuccessful, UE would need to release the RRC connection to leave PC5_CONNECTED in case of Option 1. Normally, the RRC Release comes with release of UE context, SLRBs, Layer 2 entities, radio configuration and so on. However, unsuccessful completion of the first PC5-RRC procedure has nothing to release.

In summary, when the first PC5-RRC procedure completes, a PC5-RRC connection is established for the unicast link.

In addition, PC5-S Layer-2 link establishment procedure would complete before the first PC5-RRC procedure completes. In some cases, the first PC5-RRC procedure may unsuccessfully complete after PC5-S Layer-2 link establishment. If the first PC5-RRC procedure unsuccessfully completes, the UE cannot proceed with the unicast link. Thus, PC5-RRC should indicate PC5-RRC connection failure to upper layers in order to trigger the PC5-S Layer-2 link release procedure. Therefore, upon successful completion of the first PC5-RRC procedure, PC5-RRC should indicate PC5-RRC connection failure to upper layers in order to trigger the PC5-S Layer-2 link release procedure.

If the PC5-RRC state is defined, a UE is either in PC5_CONNECTED state or in PC5_RRC state for each unicast link requested by upper layers. A UE is in PC5 CONNECTED when a PC5-RRC connection has been established. If this is not the case, i.e. no RRC connection is established, the UE is in PC5_IDLE state.

The PC5-RRC states can be characterized for a unicast link as follows:

1) PC5_IDLE:
   - The UE stores no sidelink AS context of a peer UE for a unicast link;
   - The UE performs sidelink control channel (SCCH) transmission to a peer UE (for sidelink TX);
   - The UE monitors SCIs associated with SCCH transmission for a unicast link (for sidelink RX);
2) PC5_CONNECTED:
   - The UE stores the sidelink AS context of a peer UE for a unicast link;
   - Transfer of unicast data to/from UE;
   - The UE Performs SCCH/sidelink traffic channel (STCH) transmission to a peer UE (for sidelink TX);
   - The UE monitors SCIs associated with SCCH/STCH transmission for the unicast link (for sidelink RX);
   - The UE performs sidelink RLM for the unicast link;
   - The UE performs sidelink measurement reporting for the unicast link.

Uu procedures for PC5-RRC connection establishment according to implementations of the present disclosure is described.

While in RRC_CONNECTED, UE may send sidelink UE information to request SL

TX resources to NG-RAN. Upon receiving the sidelink UE information from NG-RAN, NG-RAN will send RRC reconfiguration to UE. The RRC reconfiguration will include sidelink resource configuration, SL radio bearer (SLRB) configuration and so on.

UE will construct the PC5-RRC AS-layer configuration based on the RRC reconfiguration received from NG-RAN and then sends the constructed PC5-RRC message to a peer UE. Thus, if UE successfully completes PC5-S layer-2 link establishment, UE sends sidelink UE information to NG-RAN.

Figure 15:
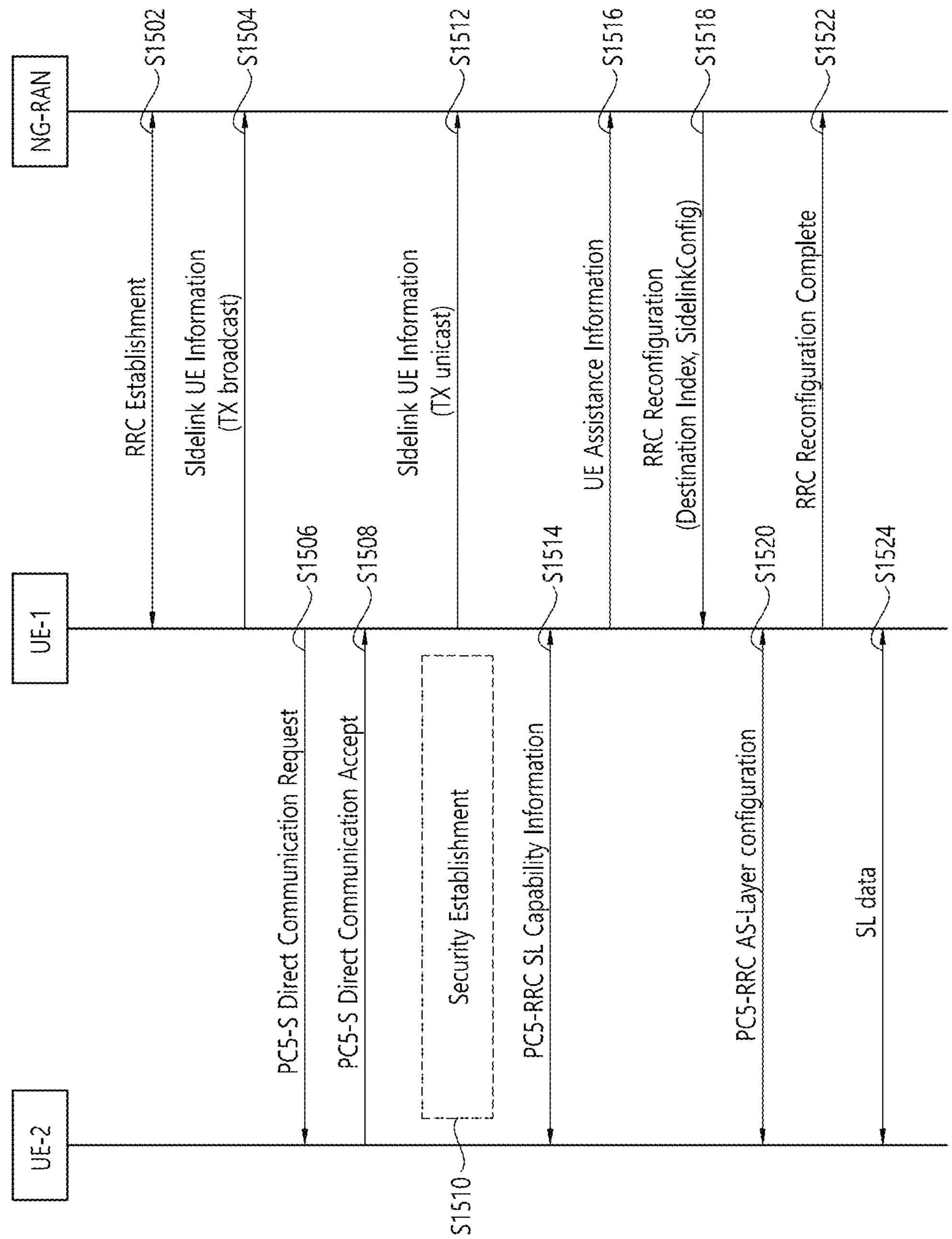
FIG. 15 shows an example of layer-2 link establishment and PC5-RRC connection establishment with Uu RRC procedures to which implementations of the present disclosure is applied.

FIG. 15 shows an example of layer-2 link establishment and PC5-RRC connection establishment with Uu RRC procedures to which implementations of the present disclosure is applied.

In step S1502, UE-1 and NG-RAN performs RRC establishment.

In step S1504, UE-1 transmits sidelink UE information corresponding to TX broadcast to the NG-RAN In step S1506, UE-1 transmits PC5-S direct communication request message to UE-2.

In step S1508, UE-2 transmits PC5-S direct communication response message to UE-1.

In step S1510, security is established.

In step S1512, UE-1 transmits sidelink UE information corresponding to TX unicast to the NG-RAN.

In step S1514, UE-1 and UE-2 exchange PC5-RRC SL capability information.

In step S1516, UE-1 transmits UE assistance information to the NG-RAN

In step S1518, the NG-RAN transmits RRC reconfiguration message including destination index and/or sidelink configuration to UE-1.

In step S1520, UE-1 and UE-2 perform PC5-RRC AS-layer configuration.

In step S1522, UE-1 transmits RRC Reconfiguration complete message to the NG-RAN.

In step S1524, UE-1 and UE-2 perform SL data transmission.

Reconfiguration between peer UEs in PC5-RRC connection according to implementations of the present disclosure is described.

The UE may reuse an existing PC5 unicast link if the pair of peer application layer IDs and the network layer protocol of this PC5 unicast link are identical to those required by the application layer in the UE for addition of a new V2X service, and modify the existing PC5 unicast link to add this V2X service. This case will trigger PC5-S layer-2 link modification procedure.

Figure 16:
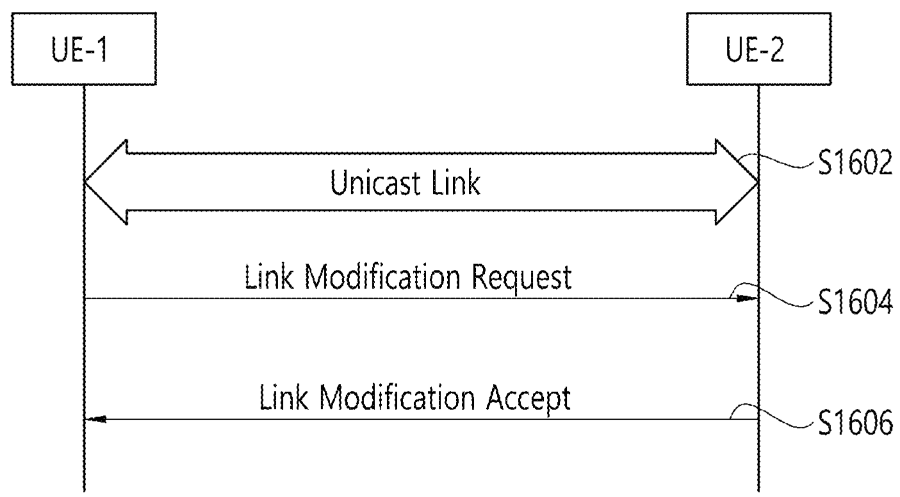
FIG. 16 shows an example of layer-2 link modification procedure to which implementations of the present disclosure is applied.

FIG. 16 shows an example of layer-2 link modification procedure to which implementations of the present disclosure is applied.

In step S1602, unicast link is established between UE-1 and UE-2.

In step S1604, UE-1 transmits link modification request message to UE-2.

In step S1604, UE-2 transmits link modification accept message to UE-1.

If PC5-S Layer-2 link modification procedure occurs, e.g., due to addition of a V2X service for the same unicast link, UE may need to update AS-layer configuration, so that trigger a new PC5-RRC procedure. Before triggering the new PC5-RRC procedure, UE in RRC_CONNECTED may send sidelink UE information and UE assistance information, and then receive a RRC reconfiguration with modified sidelink configuration.

The present disclosure can have various advantageous effects.

For example, a UE can properly reconfigure sidelink transmission and reception, in particular when the UE leaves a certain state and/or a certain area and/or when the UE detects a certain problem.

For example, the system can reconfigure sidelink transmission and reception for a UE in state transition.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

Claims in the present disclosure can be combined in a various way. For instance, technical features in method claims of the present disclosure can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method. Other implementations are within the scope of the following claims.

The invention claimed is:

1. A method performed by a first wireless device adapted to operate in a wireless communication system, the method comprising:

receiving a first sidelink configuration including first sidelink communication parameters from a network via a reconfiguration message;

while in a connected state, applying the first sidelink communication parameters received via the reconfiguration message;

leaving the connected state and entering a new state;

while in the new state:

i) keep applying the first sidelink communication parameters received via the reconfiguration message, before receiving a second sidelink configuration;

ii) receiving the second sidelink configuration including second sidelink communication parameters from the network via system information; and iii) applying the second sidelink communication parameters received via the system information, after receiving the second sidelink configuration.

2. The method of claim 1, wherein the connected state is a radio resource control (RRC) connected state, and wherein the new state is one of an RRC idle state and/or an RRC inactive state.

3. The method of claim 1, wherein the leaving the connected state comprises detecting a predetermined condition.

4. The method of claim 3, wherein the predetermined condition includes at least one of a radio link failure, a beam failure, an initiation of RRC re-establishment, an RRC re-establishment failure, a cell selection, a cell reselection, a handover failure, a reception of handover command, and/or a random access procedure failure.

5. The method of claim 1, wherein a timer starts upon leaving the connected state and entering the new state.

6. The method of claim 5, wherein applying the first sidelink communication parameters received via the reconfiguration message is kept while the timer is running.

7. The method of claim 5, wherein the timer stops upon receiving the second sidelink configuration.

8. The method of claim 5, wherein a value for the timer is received via the first sidelink configuration.

9. The method of claim 5, wherein the timer is configured per service and/or per destination.

10. The method of claim 1, wherein the first wireless device is in communication with at least one of a mobile device, a network, and/or autonomous vehicles.

11. A first wireless device adapted to operate in a wireless communication system, the first wireless device comprising:

at least one transceiver;

at least one processor; and at least one computer memory operably connectable to the at least one processor and storing instructions that, based on being executed by the at least one processor, perform operations comprising:

receiving a first sidelink configuration including first sidelink communication parameters from a network via a reconfiguration message;

while in a connected state, applying the first sidelink communication parameters received via the reconfiguration message;

leaving a connected state and entering a new state;

while in the new state:

i) keep applying the first sidelink communication parameters received via the reconfiguration message, before receiving a second sidelink configuration;

ii) receiving the second sidelink configuration including second sidelink communication parameters from the network via system information; and iii) applying the second sidelink communication parameters received via the system information, after receiving the second sidelink configuration.

12. The first wireless device of claim 11, wherein the connected state is a radio resource control (RRC) connected state, and wherein the new state is one of an RRC idle state and/or an RRC inactive state.

13. The first wireless device of claim 11, wherein the leaving the connected state comprises detecting a predetermined condition, and wherein the predetermined condition includes at least one of a radio link failure, a beam failure, an initiation of RRC re-establishment, an RRC re-establishment failure, a cell selection, a cell reselection, a handover failure, a reception of handover command, and/or a random access procedure failure.

14. The first wireless device of claim 11, wherein a timer starts upon leaving the connected state and entering the new state, wherein applying the first sidelink communication parameters received via the reconfiguration message is kept while the timer is running, and wherein the timer stops upon receiving the second sidelink configuration.

15. A processing apparatus adapted to control a wireless device in a wireless communication system, the processing apparatus comprising:

at least one processor; and at least one computer memory operably connectable to the at least one processor, wherein the at least one processor is configured to perform operations comprising:

obtaining a first sidelink configuration including first sidelink communication parameters from a network via a reconfiguration message;

while in a connected state, applying the first sidelink communication parameters received via the reconfiguration message;

leaving the connected state and entering a new State;

while in the new state:

i) keep applying the first sidelink communication parameters received via the reconfiguration message, before receiving a second sidelink configuration;

ii) obtaining the second sidelink configuration including second sidelink communication parameters from the network via system information; and iii) applying the second sidelink communication parameters received via the system information, after receiving the second sidelink configuration.

* * * * *